US008310359B2

(12) United States Patent
Abedi

(10) Patent No.: US 8,310,359 B2
(45) Date of Patent: *Nov. 13, 2012

(54) WIRELESS SENSOR NETWORKS

(75) Inventor: Saied Abedi, Reading (GB)

(73) Assignee: Fujitsu Limited, Kawasaki (JP)

( * ) Notice: Subject to any disclaimer, the term of this patent is extended or adjusted under 35 U.S.C. 154(b) by 645 days.

This patent is subject to a terminal disclaimer.

(21) Appl. No.: 12/482,236

(22) Filed: Jun. 10, 2009

(65) Prior Publication Data
US 2009/0303034 A1 Dec. 10, 2009

(51) Int. Cl.
*G08B 1/08* (2006.01)
*G08B 21/00* (2006.01)
(52) U.S. Cl. .......... 340/539.1; 340/539.23; 340/435; 340/686.1; 340/686.6
(58) Field of Classification Search .......... None
See application file for complete search history.

(56) References Cited

U.S. PATENT DOCUMENTS

| | | | | |
|---|---|---|---|---|
| 4,281,427 | A * | 8/1981 | Petters | 441/20 |
| 7,395,073 | B2 * | 7/2008 | Gwon et al. | 455/456.1 |
| 7,606,173 | B2 * | 10/2009 | Lal | 370/254 |
| 2004/0058685 | A1 * | 3/2004 | Raitola | 455/450 |
| 2005/0002354 | A1 * | 1/2005 | Kelly et al. | 370/329 |
| 2008/0261537 | A1 * | 10/2008 | Chen | 455/68 |
| 2009/0303034 | A1 * | 12/2009 | Abedi | 340/539.1 |
| 2010/0008286 | A1 * | 1/2010 | Abedi | 370/315 |

FOREIGN PATENT DOCUMENTS
WO WO 2010078920 A1 * 7/2010

OTHER PUBLICATIONS

Ahmed, M. et al., "Positioning range extension gateways in mobile ad hoc wireless networks to improve connectivity and throughput" Milcom 2001, Proceedings, Communications for Network-Centric Operations; Creating the Information Force, McLean, VA, Oct. 28-30, 2001[IEEE Military Communications Conference], New York, NY, IEEE, US, vol. 1, pp. 331-335.

(Continued)

*Primary Examiner* — Julie Lieu
(74) *Attorney, Agent, or Firm* — Staas & Halsey LLP

(57) ABSTRACT

A wireless sensor network having mobile sensors (64, 65) is provided with a mobile sink (70). To re-position the sink, candidate sink positions are found using information from the sensors. The candidate sink locations are then assessed to give a measure of their suitability to act as the new permanent position. To do this, the sink moves to each of the candidate positions in turn and obtains data and/or signals from the sensors (64, 65) within range to estimate a total throughput expected if the sink is located at that position. The sink then transfers to the most suitable candidate position permanently, until the dynamic repositioning process is triggered again. In this way it is possible to achieve a better performance than if only the center of gravity of the sink range is taken into account to position the sink. In the second embodiment, sensors are allowed to have their say in future positioning of the sink; this involves providing a capability for the sensor that makes it possible to consider both distance from the sink and the remaining battery power to come up with the best desired maximum information rate. In effect, the sensors and sink make a collective decision on the future location of the sink.

14 Claims, 22 Drawing Sheets

OTHER PUBLICATIONS

English J. et al., "CORE: Coordinated Relocation of Sink Nodes in Wireless Sensor Networks", Communications, 2006, 23$^{rd}$ Biennial Symposium on Kingston, ON, Canada, May 29-Jun. 1, 2006, Piscataway, NJ, USA, IEEE, May 29, 2006, pp. 320-323.

Yanzhong Bi et al., "Moving Schemes for Mobile Sinks in Wireless Sensor Networks" Performance, Computing, and Communications Conference, 2007, IPCCC 2007, IEEE International, IEEE, PI, Apr. 1, 2007, pp. 101-108.

Gatzianas M. et al., "A Distributed Algorithm for Maximum Lifetime Routing in Sensor Networks with Mobile Sink", IEEE Transactions on Wireless Communications, IEEE Service Center, Piscataway, NJ, US, vol. 7, No. 3, Mar. 1, 2008, pp. 984-994.

Younis M. et al., "Base-station repositioning for optimized performance of sensor networks", Vehicular Technology Conference, 2003, VTC 2003-Fall, 2003 IEEE 58$^{th}$ Orlando, FL, USA, Oct. 6-9, 2003, Piscataway, NJ, USA IEEE, US, vol. 5, Oct. 6, 2003, pp. 2956-2960.

European Search Report dated Feb. 4, 2010 and issued in corresponding European Patent Application 08157990.6.

Akkaya et al., "Sink repositioning for enhanced performance in wireless sensor Networks", Computer Networks, Elsevier Science Publishers B.V. Amsterdam, NL vol. 49, No. 4, (2005).

Al-Karaki J N. et al.,"Routing techniques in wireless sensor networks; a survey", IEEE Wireless Communications, IEEE, Service Center, Piscataway, NJ, U.S., vol. 11, No. 6, (2004).

IEEE 802.15.4 standard, Wireless Medium Access Control (MAC) and Physical Layer (PHY) Specifications for Low-Rate Wireless Personal Area Networks (WPANs), Sep. 6, 2006.

European Search Report issued Feb. 9, 2009 in corresponding European Patent Application 08157990.6.

\* cited by examiner

WIRELESS SENSOR NETWORKS

FIELD OF THE INVENTION

The present invention relates to wireless sensor networks and more particularly to sink (base station) positioning in such networks.

BACKGROUND OF THE INVENTION

Recently, the concept of the wireless sensor network (WSN) has received considerable attention. A WSN typically includes a collection of low-power transceivers (henceforth called sensors) each having some kind of sensor function for one or more properties of an environment in which they are placed. The term "environment" here has a very broad meaning and could include, for example:—a geographical area such as a farmer's field, an area of ground requiring monitoring for security reasons, or a volcano; a specific facility such as an industrial plant, a hospital, a retail store or financial institution; or a human body. Likewise, the range of properties which might be sensed is wide, including temperature, pressure, sound, vibration, motion, the presence of specific chemicals, etc.

Each sensor is capable of transmitting sensor data, usually as discrete packets, to any other devices in its vicinity, usually to another sensor. By relaying data from one sensor to another, the sensed data can be directed to a so-called sink or base station and gathered (temporarily stored). Although the precise communication standard used by the sensors is not important, one suitable standard is IEEE802.15.4, a current implementation of which is called ZigBee.

Depending upon the capabilities of the sink, the data can be forwarded from the sink directly or indirectly to some form of outside entity, typically via another network such as a mobile telephone network or the Internet. Where the sink is able to communicate with another network it can also be called a gateway (GW).

In some implementations, the terms sink, base station and gateway mean the same thing; in others they denote distinct functions, in which case the sink will communicate the gathered data to a separate base station and/or gateway for further transmission, possibly after some kind of aggregation or other processing.

Moreover, in some implementations, the sensors (or a subset thereof) are also capable of acting as the sink. Multiple sinks, and multiple gateways, may be present in a WSN but for simplicity, a single sink is assumed in the following description.

In the present specification, the terms "sink" and "base station" are used synonymously to denote any kind of data-gathering entity in a wireless sensor network whether or not it also acts as a gateway.

Some possible applications of WSNs are shown in FIG. 1. A WSN applied to the human body is called a Body Area Network (BAN), as indicated at 10 in the upper part of FIG. 1. In this instance, the sensors 12 might monitor body functions such as heartbeat and blood pressure, and transmit their data to a sink 14 in the form of a portable computing apparatus such as a mobile phone, PC or PDA. As indicated this would normally have a wireless link, via another network 50, to an external data server 16 for analysis and forwarding on, if necessary, to a data centre ("SBS Platform") 18, allowing decisions to be taken based on the sensed data. For example, changes in the heartbeat of a hospital patient might lead to a decision to signal medical staff to attend to the patient.

The left-hand lower part of FIG. 1 depicts a WSN 20 applied to a geographical area, for example to monitor environmental conditions such as air quality. Such a WSN is also termed an Environment Sensor Network or ESN. By being scattered over a geographical area, the sensors 22 are essentially fixed in this application. As indicated, the sensors might communicate using the above-mentioned Zigbee standard with the data being routed to a gateway GW 24 for further transmission over network 50.

Next to this in FIG. 1 is indicated another form of WSN 30 in which the nodes are sensors on board vehicles 32, and are thus mobile. In this case the sink is provided in the form of a gateway 34 which might be fixed to a mast at a traffic intersection for example, or might itself be mobile by mounting it on another vehicle. Again, monitoring of pollution is one possible application. Although not shown in FIG. 1, each individual vehicle 32 may also have its own WSN formed by sensors at various points in and on the vehicle, for monitoring parameters such as speed, temperature, tyre pressure and so forth. Such a WSN is an example of an Object Sensor Network or OSN.

The lower right-hand part of the Figure indicates a WSN 40 for assisting with disaster prediction, recovery, or prevention. As before, sensors 42 are scattered around a geographical area to be monitored, with a gateway 44 acting as the sink for receiving the sensor data and forwarding the same over network 50 to server 16. By raising alarms in response to sensor data from buildings, the ground or the atmosphere, rescue operations can be started more quickly to deal with earthquakes, fire or flooding. Compared to conventional monitoring networks, WSNs are cheaper to deploy and at the same time they provide more powerful and accurate real-time tools to acquire the data.

As will be apparent from FIG. 1, in general the sensors of a wireless sensor network may be fixed or mobile, and the sink may be fixed or mobile. However, the present invention concerns a WSN in which the sink is mobile. In general, we can assume that the sink is movable on demand, but otherwise stationary.

Commonly, the sensors are unattended devices of low computational ability and reliant on battery power; thus, power consumption of sensors is a major consideration. Transmission of data is typically the most power-hungry function of a sensor. For this reason, it is preferable for a sensor to communicate only with its nearest neighbours, necessitating the use of multi-hop techniques to enable data to reach the sink by several different routes. Another technique employed to conserve battery power is to deactivate sensors which are not currently engaged in sensing or communication (including relaying). Thus, sensors may alternate between active and inactive states (also called "awake" and "asleep"), for example in response to the presence or absence of a sensed property or incoming data. In this way the useful lifetime of the sensor can be prolonged. However, unless a sensor has some way to replenish its power, its battery will eventually become exhausted, at which point it assumes a "dead" state. Dead sensors reduce the coverage of the network and restrict the number of available routes for data, to the point where in the worst case, the WSN is no longer operable. Consequently, related to the need to conserve battery power of sensors is the desire to keep each sensor "alive" for as long as possible. This is particularly challenging when the sensors are moving, for example as a result of being mounted on a vehicle or a human body.

As will be apparent from the above discussion, it is possible to define one of a limited number of states for each sensor at a given point in time. The sensor may be "active", in the sense of transmitting its own sensed data; it may be acting as a relay (this is distinguished from "active" for present purposes); it may be "inactive" due to not having any data to transmit or relay; or it may be dead. The concept of the "state" of a sensor is important for managing the network, as explained in more detail below.

Another consideration, of particular relevance to the present invention, is appropriate positioning of the sink. Generally, the sensors transmit data in all directions indiscriminately without knowing or caring which other nodes receive it. A sink far from the more active part(s) of a wireless sensor network will tend to receive less data, with greater delay (latency), and incur more power expenditure by the sensors, than one placed closer to the action. In a sparse WSN (one having relatively few sensors for the geographical area covered), some positions of the sink may not allow the sink to communicate with all parts of the WSN. Conversely, in a dense WSN there is generally no problem for all sensors to reach the sink, but those sensors closest to the sink will tend to suffer high power drain owing to the large demands on them for relaying sensor data to the sink. This will tend to drain the available power in a short time if the sink stays still.

Thus, it is unlikely that a fixed sink will remain optimally positioned for any length of time. By its nature, a wireless sensor network has a constantly-changing configuration, owing to changes of state of the sensors, their movements if any, and changes in the property or properties being sensed, so the appropriate position for the sink is liable to change frequently, possibly over quite short timescales.

In one form of wireless sensor network, the sensors are RFID-based devices which might not be reliant on a battery power, but as the available transmission power of such devices is very low, similar considerations still apply regarding placement of the sink.

Thus, dynamic repositioning of the sink in a wireless sensor network has been proposed as a technique for increasing sensor lifetime whilst improving the quality and throughput of communications over the WSN while reducing the potential delays.

Unfortunately, it has been shown that the problem of sink positioning in a WSN is an "NP-complete" problem and thus difficult to solve with the very limited computing resources available in the WSN.

Accordingly, it is desirable to find a solution for sink positioning in a WSN which is efficient in terms of computing resources and effective to position the sink at desirable locations.

It is further desirable to provide a technique for sink positioning which takes account of the needs of the sensors in terms of their remaining energy stores.

SUMMARY OF THE INVENTION

According to a first aspect of the present invention, there is provided a method of relocating a mobile sink in a wireless sensor network, the wireless sensor network comprising sensors for transmitting sensor data and the mobile sink, the method including: selecting candidate sink locations; finding the suitability of each candidate sink location using a calculation producing a result indicating the suitability of the candidate sink location for communication with a plurality of the sensors; comparing the result for each candidate sink location to determine the most suitable candidate sink location; and locating the mobile sink at the most suitable candidate sink location by physically positioning the mobile sink.

Thus, embodiments of the invention can allow the sink to be repositioned dynamically based on current suitability of selected sink locations. The pre-selection of sink locations cuts down the complexity of the sink location problem to a few alternatives.

Preferably, the method is initiated by the sink in response to a predetermined trigger event including at least one of: a change in an amount of data received by the current sink, and a lapse of a defined time interval.

Any information required from the sensors to select and/or assess the candidate sink locations may be acquired during the normal transmission and reception of data, for example by deriving a channel estimate from such data. However, preferably methods according to embodiments of the invention further include the sensors transmitting sensor information for use during the locating method. The sensor information may be transmitted at any suitable point(s) during the method. For instance, and perhaps following an initial signal from the sink, the sensors which are in range of the sink (and therefore the sensors which receive that signal) can transmit at least their location to the sink before the sink selects candidate sink locations.

Selection of the candidate sink locations may be dictated by the current sink location and/or by one or more other factors. In a preferred embodiment, the selection includes identifying the centre of gravity of the sensors within reception range of the sink (in its current position) and selecting candidate sink locations surrounding the centre of gravity. Preferably, the centre of gravity forms one selected candidate sink location and there are one or more other candidate sink locations provided which may be equidistant from or randomly spaced from the centre of gravity. Use of the centre of gravity as a simple pre-selection criterion is advantageous in that this position is equidistant between the sensors currently in use. Nevertheless, another central point, such as a weighted centre of gravity could be used. Of course, it is not possible to move any specific point, such as the centre of gravity, the sink can move closer to that point.

If the sensors transmit sensor information, this can include sensor location information which is used to identify the centre of gravity or other central point during selection of candidate sink locations.

The sink is mobile and therefore in order to fully assess each of the candidate sink locations it can be advantageous to physically position the sink at that location and receive transmission from the sensors within range of that location. Alternatively, more complex processing can estimate suitability of each of the candidate sink locations.

In the above method, finding the suitability of each candidate sink location may include the sensors sending a reference signal to the sink at the candidate location to assist the sink in determining or estimating a channel between the sensor and the potential sink location. The sink can then perform the calculation to estimate the channel based on the reference signals. Alternatively, normal transmission of data from the sensors could be used to assist the sink in estimating a channel.

In preferred embodiments, the sink determines a transmission rate achievable from each sensor at the candidate location by estimating the channel and taking into account the sensor information (such as sensor location information) transmitted to the sink by the sensors. This may be followed by calculating a total transmission rate for all the active and relay sensors within range of that location and comparing the result of this calculation for each candidate location. That is, the candidate sink location for which the achievable throughput is a maximum is selected as the most suitable candidate, based on the total transmission rates.

In another embodiment of the present invention, the suitability calculation takes a desired transmission rate of the sensor into account. Preferably, the sensor information transmitted to the sink for this embodiment further includes desired rate information of the sensor. Such desired rate information can indicate a transmission rate at which the sensor wishes to send data to the sink. The sink can determine the suitability of its candidate locations by taking into account the extent to which it could satisfy the desired rate of each sensor.

More specifically, this determination may include the sink taking into account a probability measure that the transmission rate from a sensor will fall below the desired rate owing to limitations of the channel between them. The method may therefore further include the sink calculating a so-called distance (or shortfall) related to this probability for each sensor, and a total distance for all the sensors within range. This total distance becomes the result compared to determine the most suitable potential sink location. Here, the candidate location with the lowest total shortfall (which might include negative shortfall) is the most suitable candidate.

Preferably, each sensor obtains the desired rate information on the basis of at least two variables. These may include the amount of data to be transmitted, the distance from the sink at its candidate location and energy available to the sensor. In this context, "energy" may be the remaining battery capacity of a battery-powered sensor.

In either case or if both the transmission rate and the shortfall are taken into consideration, the determination of the most suitable candidate is preferably followed by relocation of the mobile sink at the most suitable candidate sink location. Thus in essence, the sink moves between a plurality of selected candidate locations before determining the most suitable of these and moving finally to the most suitable location, remaining there until the method is triggered again.

In the above method the sink can preferably carry out normal sensor data reception and transmission when it is in each candidate location. This allows relocation without excessive disturbance of the data collection from the sensors. In another embodiment, the sink carries out normal sensor data reception and transmission even whilst transferring between different candidate locations.

Further aspects of the present invention provide a WSN, a sensor and a device for use as a mobile sink.

BRIEF DESCRIPTION OF THE DRAWINGS

Reference is made, by way of example only, to the accompanying drawings in which.

DETAILED DESCRIPTION

Figure 1:
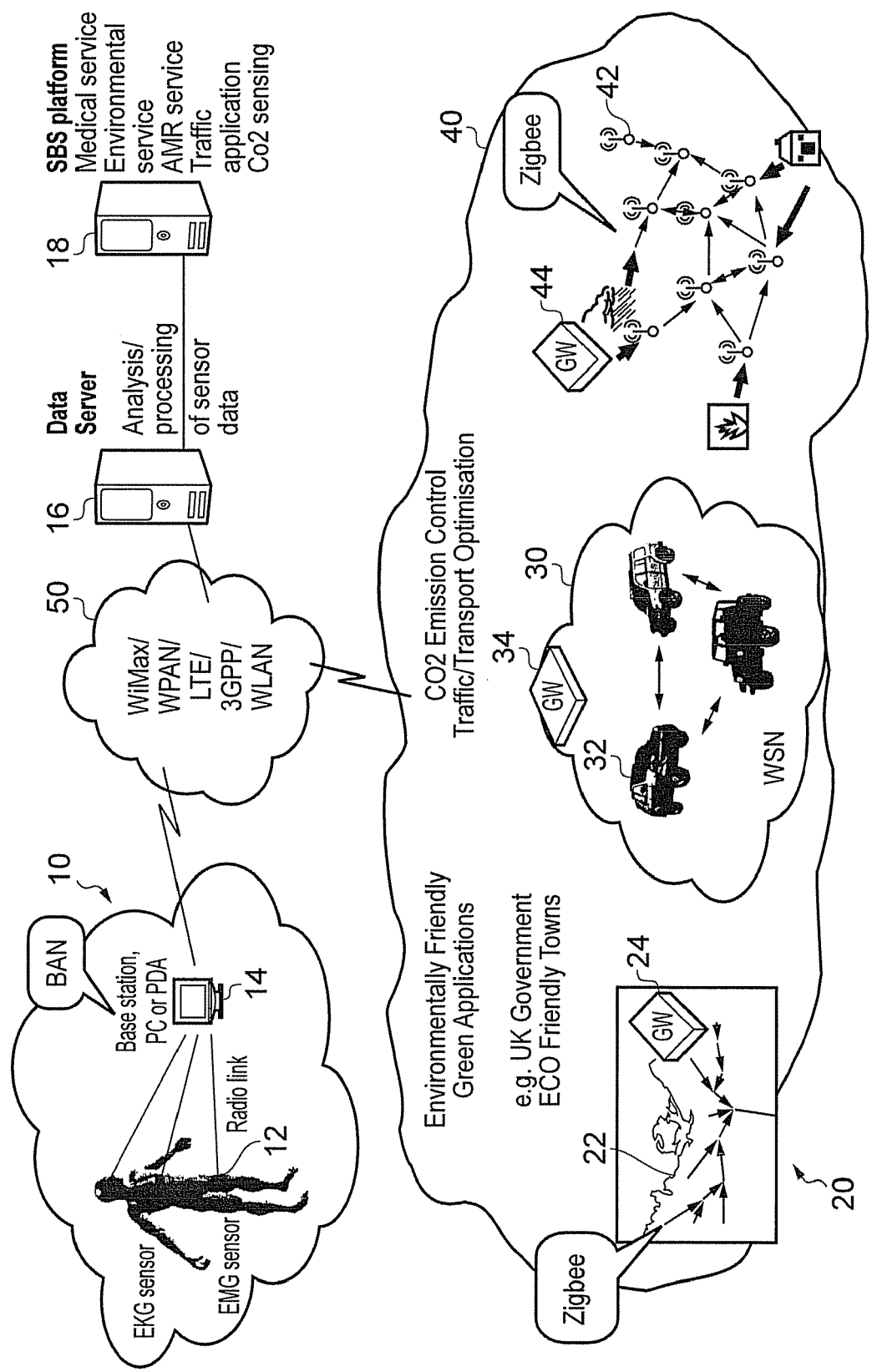
FIG. 1 illustrates some possible applications of wireless sensor networks (WSNs)

Before describing the preferred embodiments of the present invention, a brief explanation will be given of the theoretical background. We assume that a number of sensors is allocated in a wireless sensor network, and that only one sink or Base Station is available for this WSN. It is also assumed that any sensor may attempt to transmit data packets to the sink. A sensor by definition can act as a transmitter (i.e. active sensor), it can be out of action due to the lack of energy in the sensor battery (i.e. dead sensor), it can be inactive due to lack of packets, it can act as a relay or it can act as a sink. Therefore we define the sensor states in general as:

$$C_i=[c_1 c_2 c_3 c_4 c_5]=[\text{Sink,Inactive,Active,Relay,Dead}], \quad i=1,5 \qquad (1)$$

It should be noted, however, that in the invention to be described, the role of the sink is provided separately from the sensors themselves so that there is no need for any sensor to act as a sink. It is assumed that packets are transmitted by the sensors either directly or through relays to the sink. Each communication hop from a sensor to a relay, relay to sink etc. is referred to below as a "link" having a "channel". Each sensor can change its state on an autonomous basis or in harmony with other sensors. Each event is defined as a point of time (or time step) at which the state of one or more sensors changes.

A communications channel in the WSN is modelled, for example, as follows. Using an equation well known from communication theory, a packet transmission signal between any two sensor nodes, or between a sensor and sink, can be represented by:

$$y(t)=d^{-\alpha/2} \cdot h(t) \cdot x(t) + \eta(t) \qquad (2)$$

where t is the current time, y(t) is the received signal, d is the distance between the sensor nodes, $\alpha$ is the path loss component of the channel, h(t) is the channel gain describing the fading between the two sensor nodes, x(t) is the transmitted signal, and $\eta(t)$ is noise. It is assumed that the radio channel is a Rayleigh flat-fading channel, varying randomly anywhere between a perfect channel and no channel at all, which can be expressed as h(t)~CN(0,1). It is assumed that the radio channel remains constant during the packet transmission, but may change over time to a time varying fading channel.

Given a channel h(t), the maximum rate at which reliable communication is possible at time t is represented as:

$$I(t) = \log\left(1 + \frac{P_x |h[t]|^2}{d^\alpha N_0}\right) \qquad (3)$$

where the transmission power $P_x$ depends on the energy available at the transmitting sensor. Here, $N_0$ is the standard deviation of the noise component $\eta(t)$. It is assumed that in the current fading environment the maximum rate I(t) for a reliable communication is random as well.

The following simple energy consumption model can be used to describe the instantaneous energy variations in the sensor battery:

$$\varepsilon(t) = \varepsilon_0 - \sum_{m=1}^{t-1} \varepsilon_{c_m} \qquad (4)$$

where $\varepsilon_0$ is the initial energy value, $c_m$ is one of sensor states at time m, and $\varepsilon_c$ is the energy expended (consumed) in state c during each time step t. It is assumed that states of sensors change in discrete time steps, and that between successive time steps all conditions remain the same. In the subsequent description, time t is the current time (present time step) in the network.

Figure 2:
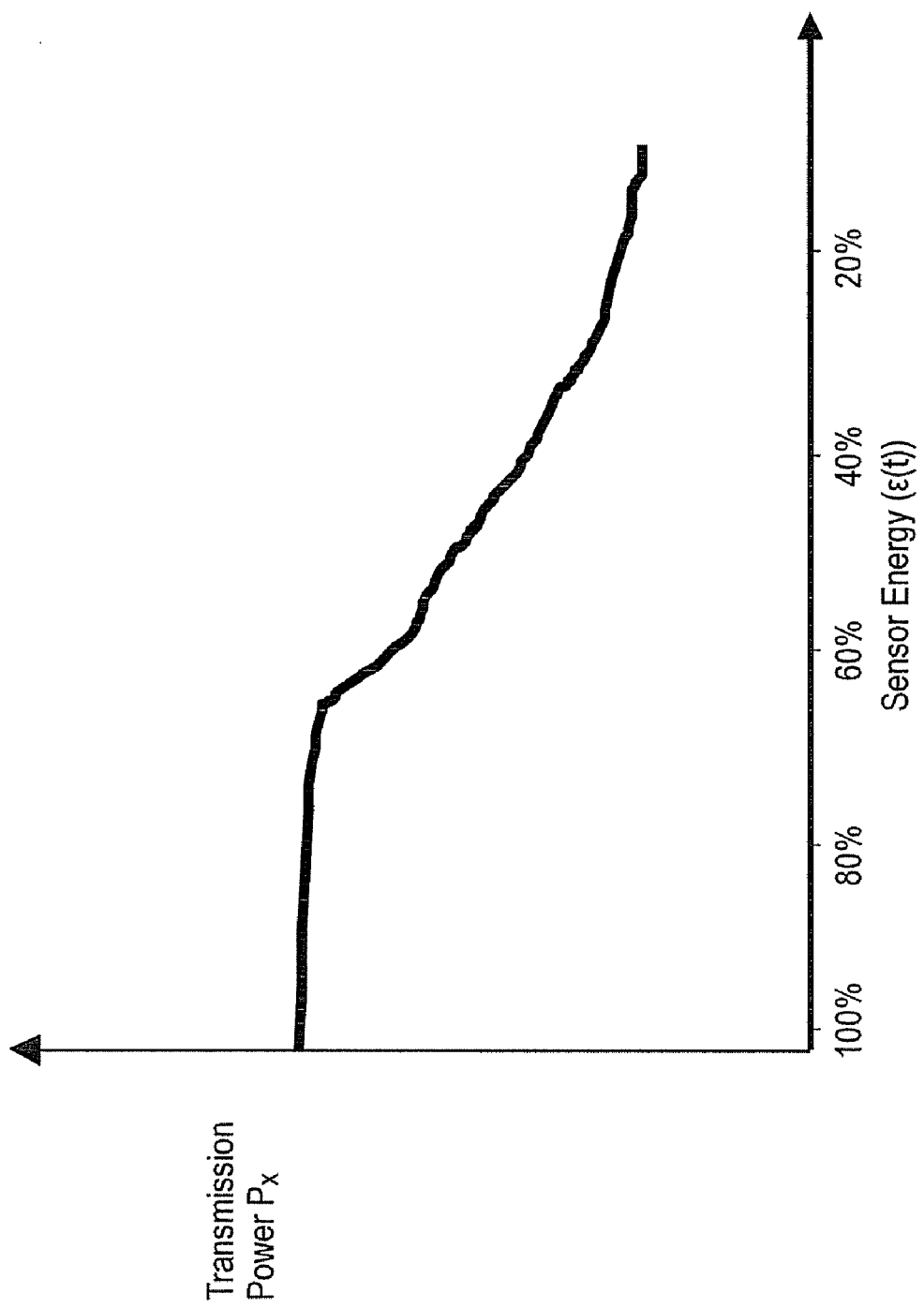
FIG. 2 shows a relationship between transmission power and sensor energy in a WSN.

It is assumed that available transmission power $P_x$ is a function of available remaining energy. An example of this relationship is shown in FIG. 2, from which it is clear that declining energy leads to declining transmission power.

Figure 3:
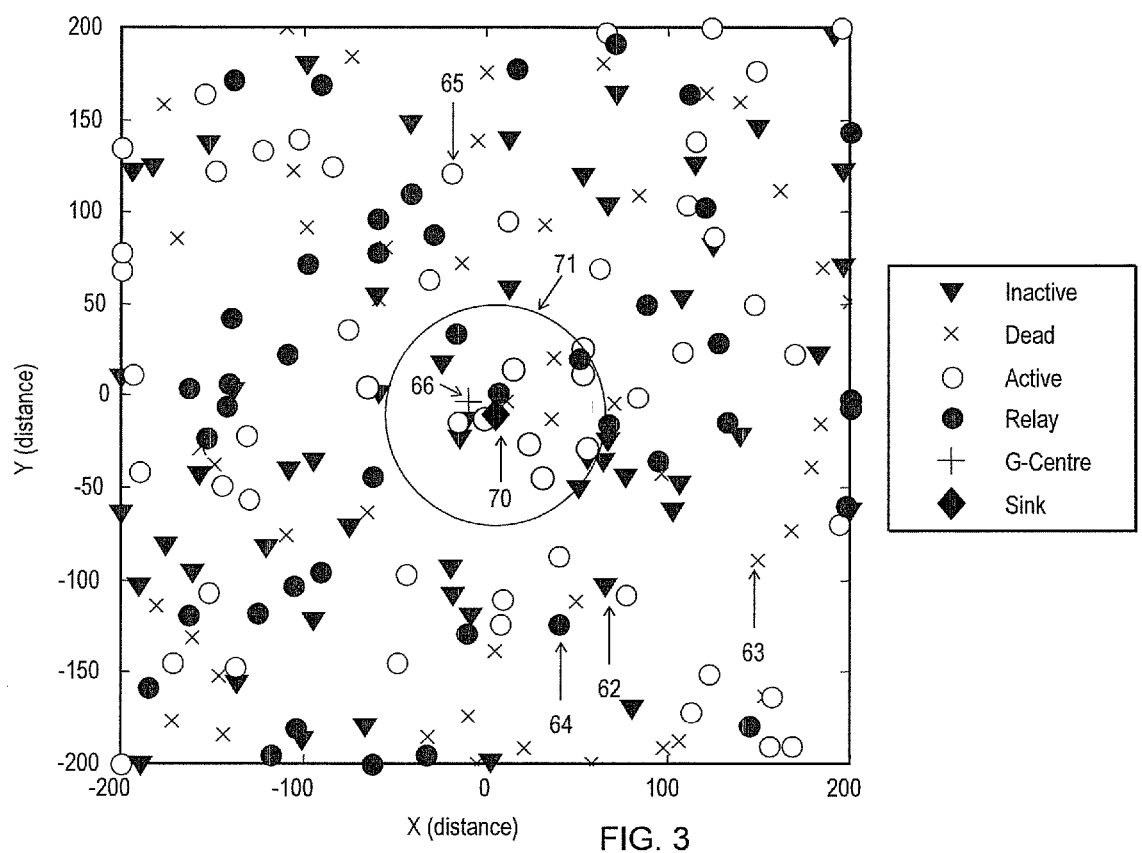
FIG. 3 shows a typical configuration of a WSN to which the present invention is applied.

FIG. 3 conceptually shows a WSN 60 to which the present invention is applied. The horizontal and vertical axes represent distance (in arbitrary units) over an area covered by the WSN. As indicated, the mobile sensors may be positioned anywhere in the area considered, and in accordance with the possible states referred to above, they include inactive sensors 62, dead sensors 63, active sensors 64 and relay sensors 65. The mobile sink 70 is shown here positioned approximately centrally in the WSN 60. As indicated in the Figure, the sink 70 will typically only have a limited reception range 71 (which is shown here as a circle for simplicity, but may be directional), and thus can only communicate directly with a subset of the sensors and grid points. As the sink moves, it can communicate directly with different sensors as different sensors fall within its reception range. A point 66 marks the so-called "centre of gravity" of the sensors. This may be calculated, for example, based on the geographical centre of the sensors within range of the sink, taking into account the positions of all the currently-active and relay sensors, or may take into account other factors too such as amount of data at each active sensor. Note that owing to the capability for multi-hop communication as referred to above, this does not prevent the sink from gathering information from all the live sensors in the whole WSN. The sink may directly forward collected data from the sensors to an outside entity. The wireless sensor network may alternatively have a geographically fixed data delivery port (not shown) to which all the information gathered by sink 70 is delivered.

GENERAL EMBODIMENT

Figure 4:
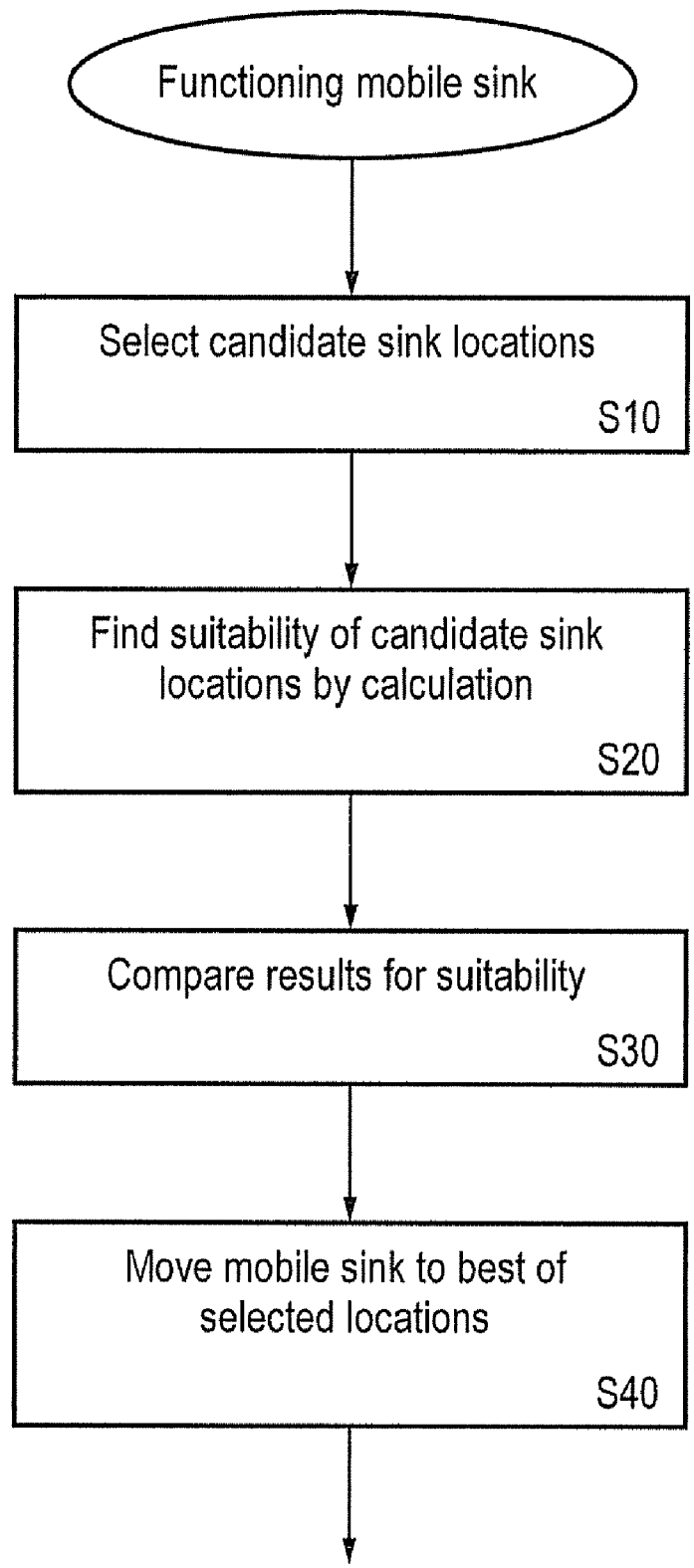
FIG. 4 shows a general embodiment of the invention.

A general embodiment of the present invention will now be described with reference to FIG. 4 which shows steps of a sink positioning method in a WSN. The network allows for the sink to be independently mobile, and its position to be controllable. This may be achieved, for example by mounting a sink device on a controllably moveable support, such as a vehicle or robot, or on a runner which can be translated along one or more tracks or lines. In embodiments of the present invention, the sink 70 can thus be considered as a "mobile" sink device, which is dynamically repositioned according to the method described. The method starts with the WSN already functioning. That is, the mobile sink sends and receives data as necessary to gather information from live sensors in the WSN and forward it appropriately towards an outside entity. At the start of the relocation method, candidate sink locations are selected by the sink in step S10. This selection process may for example use as an input data currently being transmitted in the WSN, or specific transmission of information from the sensors may be used to assist the selection. One preferred method of selecting candidate sink locations can be based on the centre of gravity of the sensors.

Once the candidate sink locations have been selected, they are assessed by the sink in Step S20 to find their suitability for receiving data from the sensors. The assessment may involve, for example, the sink device moving to each candidate location in turn and receiving signals. The result for each location is compared in the sink in Step S30 and finally in Step S40 the mobile sink is moved to the best of the selected locations.

The calculations to find the suitability of candidate sink locations can be based on telecommunication parameters best adapted for the job of assessing the positions in the particular WSN in question.

First Embodiment

A first specific embodiment of the present invention will now be described with reference to FIGS. 5 to 9 showing steps of a sink positioning method.

The first embodiment takes into account changes of the maximum transmission rate I(t) for the communication links between the sensor and the sink. Changes in I(t) occur due to movements of sensors if the sensors are mobile, and their changes of status as well as (possibly) changes in ambient conditions. They also occur due to movement of the sink.

The virtual sink positioning is assumed to be performed on a time-step basis as mentioned above.

First, it is assumed that the sink is functional. To begin with (when the system first starts operating), it may be convenient to chose an initial sink location at a central point (relative to the WSN coverage area). Alternatively, any arbitrary potential sink location could be used initially, perhaps based on user convenience or the method as essentially described below. Thereafter, the sink can be repositioned as desired using the method to be described.

The method of the present invention has to be triggered in some way. The trigger for the following steps may be provided by the sink 70 observing a significant reduction in data it receives (for example, the amount of data per unit time falling below a predetermined threshold). The cause of such a reduction might be, for example, failure of a nearby sensor/relay, but the sink would not know this directly. A steady or increasing data throughput to the sink would not normally be a trigger for performing the method. However, the method could alternatively or additionally be triggered periodically regardless of the incoming data, to check whether the current sink positioning is appropriate.

Figure 5:
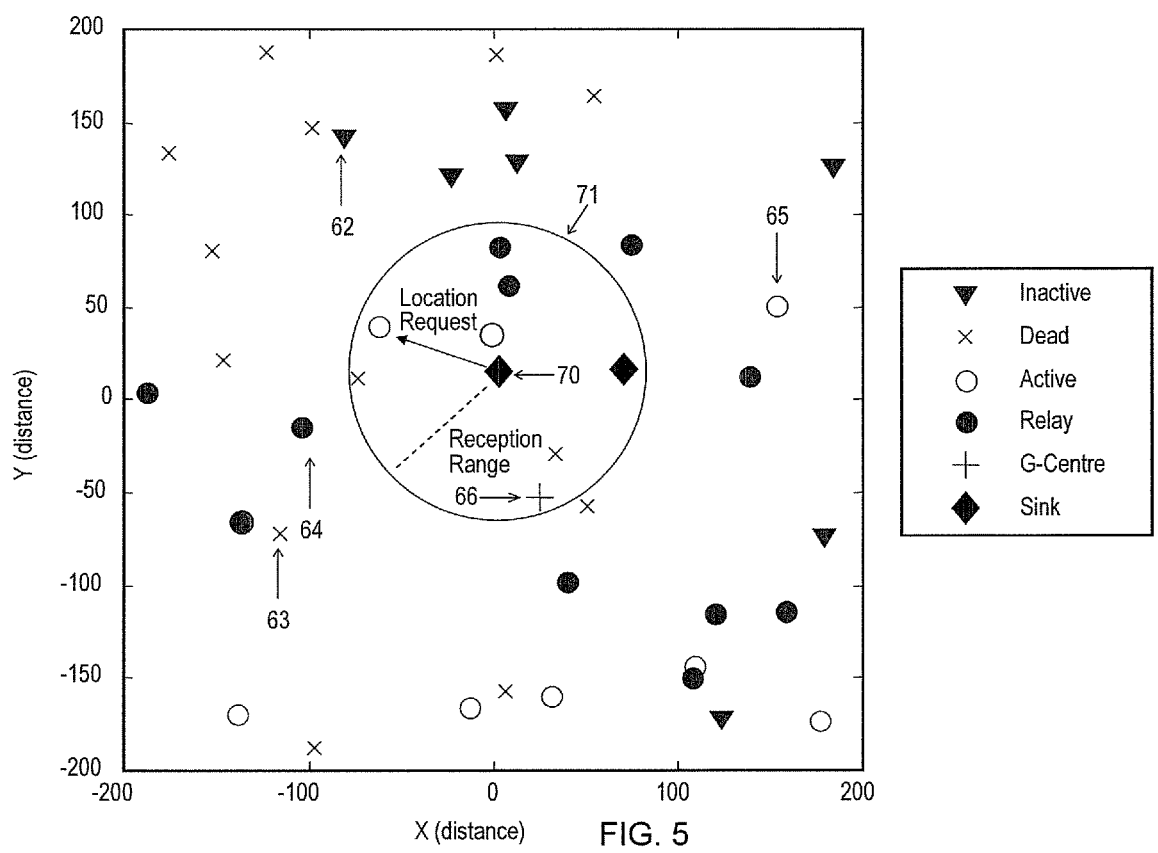
FIGS. 5 to 8 show successive steps in a method of a first embodiment of the present invention.
Figure 6:
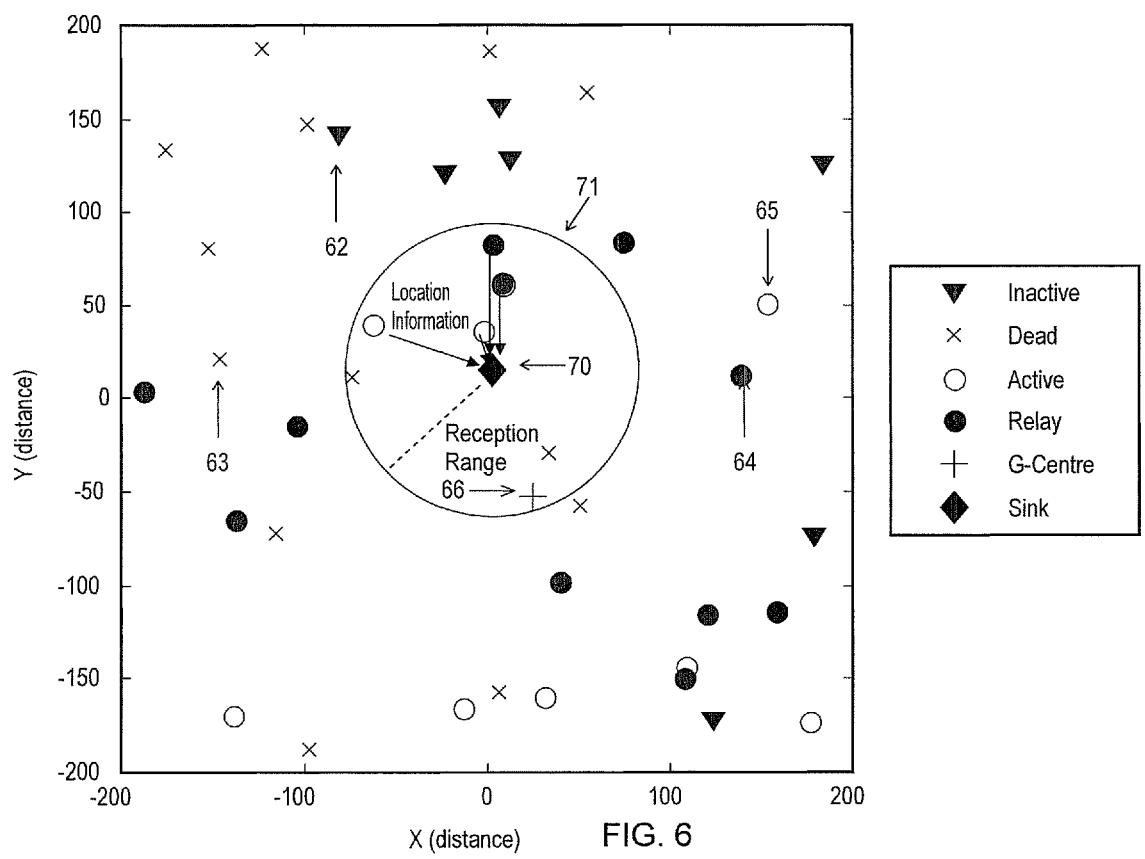
Figure 7:
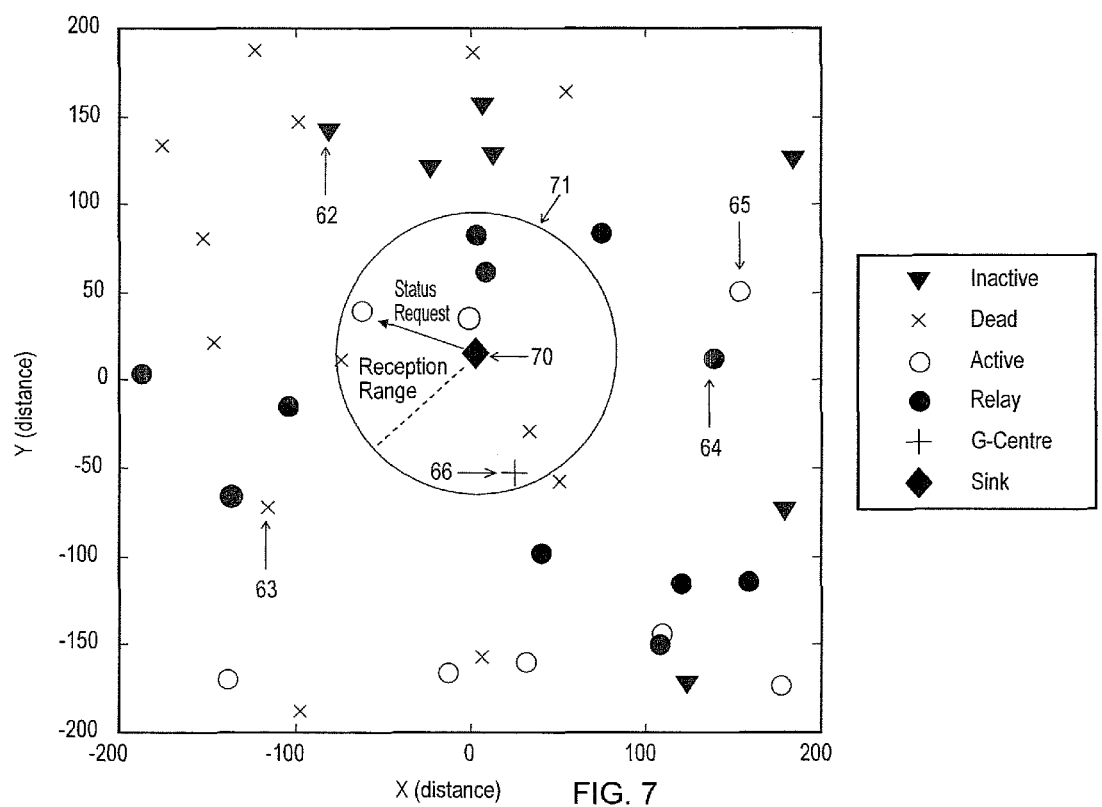
Figure 8:
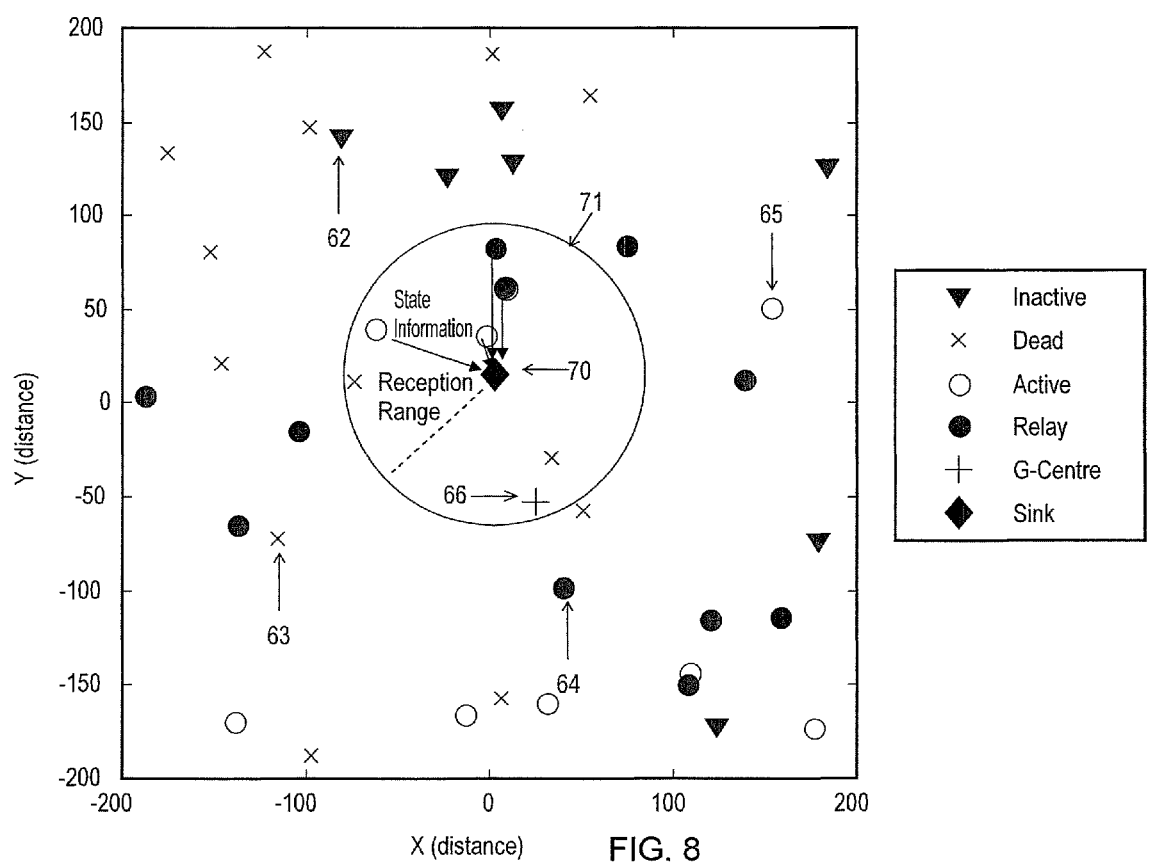

1. The basic assumption is that each candidate sink location has its own reception range 71. The sink 70 sends a signal from its current location to all the sensors within the reception range, requesting them to provide location information, as shown in FIG. 5. This information can simply be the distance from the sink.
2. Each sensor sends location information and this is processed to identify approximately which sensors are currently within the reception range as shown in FIG. 6. It is assumed that each sensor is capable of knowing its own location, for example, using GPS. Obviously, "dead" sensors would not participate in this process, and normally, nor would "inactive" (sleeping) sensors. However, reception of the sink signal may be arranged to "wake up" the sensors from a sleep state and transmit their location if so desired, so that they too are identified in this update step.
3. The sink then requests those sensors identified within its reception range to forward their state information (FIG. 7). As shown in FIG. 8, the sensors then provide state information. Thus the sink has now identified approximately which sensors are currently within its reception range and the state of each of these sensors. In other words the potential sink stores some form of representation of the sensor network in its neighbourhood, identifying sensors by their location and recording the state of each. If there is no change or little change in state of the sensors, the method may include an option to stop at this point without further steps, because relocation may not be required.

In another scenario, any steps in the method obtaining sensor states may be optional. In a system with a high level of sensor movement, for example, changes in state may not be particularly important and therefore signalling can be reduced by not taking them into consideration.

In alternative embodiments the sink may request the location and state information at the same time and receive them at the same time.

4. The sink then determines the current centre of gravity for all active and relay sensors (or nodes) within its reception range and chooses a number of candidate locations surrounding the new centre of gravity and potentially including the new centre of gravity, based on a random or deterministic selection process within a specific radius of the new centre of gravity. This radius is likely to be smaller than the reception range. As an example, the candidate locations may include the new centre of gravity and three further candidate positions, possibly equidistant from (and thus centered about) the new centre of gravity.

5. The sink then temporarily moves to each candidate position (for example the new centre of gravity and the three other candidate locations chosen as explained above). During the visit to each candidate position, full and normal transmission-reception procedures continue between the sink and all the involved sensors. Thus, the sink functions as if it were in its permanent position so that it receives data transmission from sensors within its reception range as usual and transmits the data on to an outside entity or final data delivery port. In each candidate location in turn, the sink asks the sensors to send a reference signal which will be employed to determine or estimate the channel information $h_{sx}(t)$ between the sink and each sensor node x. There may be different sensors within this new range around the candidate location. The reference signal may be a pilot signal, but it would be possible to use another transmission, for example, of the sensor state or data transmission, if that transmission is required anyway and can be used to derive the channel.

6. The sink determines the maximum rate at which reliable communication is possible at time t between the sink at that candidate location j and each relay or active sensor node i as:

$$I_{ji}(t) = \log\left(1 + \frac{P_i|h_{ji}[t]|^2}{d_{ji}^\alpha N_0}\right) \quad (5)$$

where $P_i$ is transmission power allocated to each sensor, whose value can be, for example, the same for each sensor or a randomly assigned transmission power value using a Gaussian codebook and $d_{ji}$ is the distance between the candidate location and the sensor. This distance may be calculated by the sink in its candidate location, or there may be further transmission of location information from the sensors. Such transmission may be useful if sensors which have come within range by movement of the sink to the candidate location are to be taken into account.

7. The sink then determines the total maximum rate at each temporary location for current active and relay links associated with it:

$$I_j(t) = \sum_{i=1}^{K}(I_{ji}(t)) = \sum_{i=1}^{K}\left(\log\left(1 + \frac{P_i|h_{ji}[t]|^2}{d_{ji}^\alpha N_0}\right)\right) \quad (6)$$

where K is the number of active relay and sensor nodes in range in that candidate location.

8. After the sink has visited all the candidate locations it compares all the recorded values including the values recorded at the centre of gravity and chooses the location that maximises the total achievable reliable link throughput as its permanent position until the next positioning event using:

$$J(t) = \arg\max_j(I_j(t)) \quad (7)$$

9. Finally, the sink then moves to location J(t) as its new permanent location until the next decision time (i.e. repositioning event).

As will be apparent from the above, the result is that the sink 70 moves from its current position to a new position which is calculated to tend to raise the possible maximum rate. Over time, the sink can migrate far from its original position to adapt to changes in the network, for example as "hot spots" of activity arise in particular parts of the coverage area.

To test the effectiveness of the above algorithm, simulations have been performed on a periodic event basis, in other words assuming that events take place at fixed time points and that between these time points everything stays the same. The parameters for the simulation (in arbitrary length units) are shown in Table 1. It is assumed that sensors move around and/or change state randomly.

TABLE 1

| Simulation Parameters | |
|---|---|
| Parameters | Value |
| Dimensions | 400 × 400 |
| Transmission Range | 30 |
| Reception Range (Sink) | 60 |

Figure 9A:
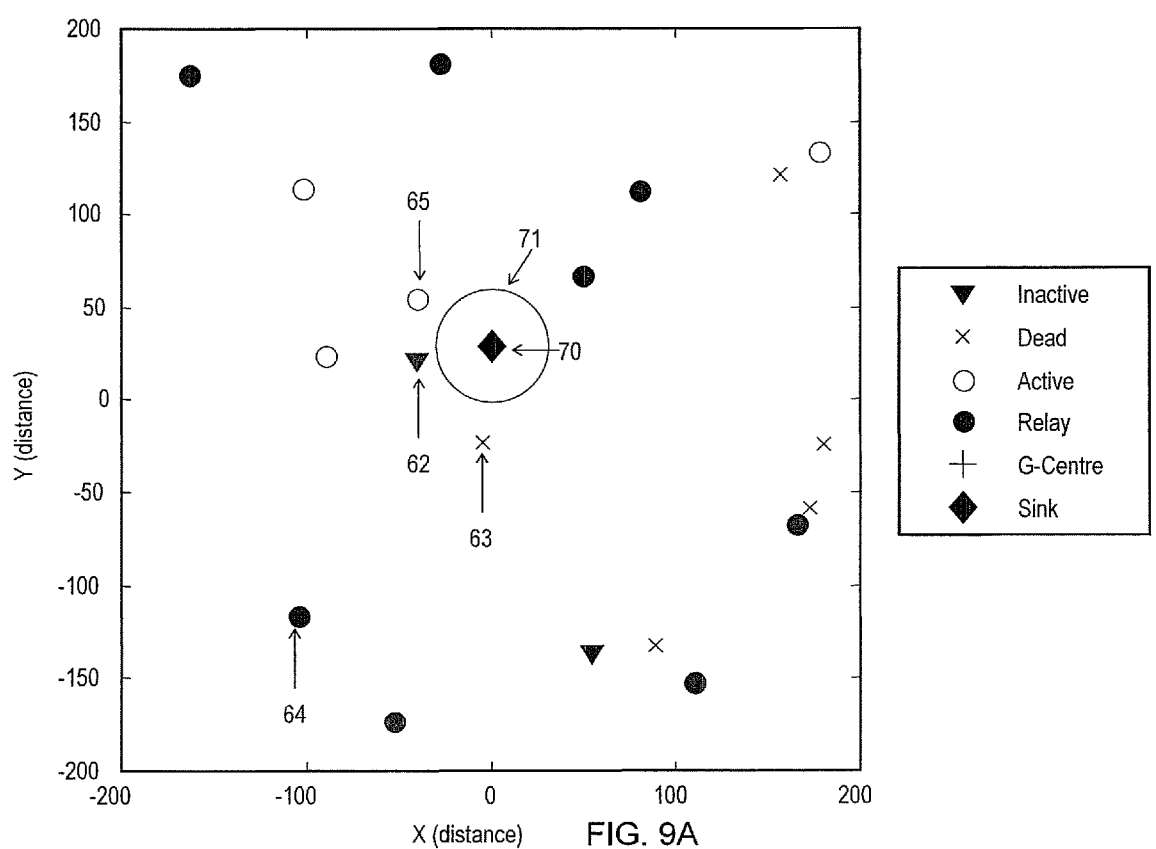
FIGS. 9A and 9B, and FIGS. 10A and 10B, show the results of simulations for indicating the effect of the first embodiment.
Figure 9B:
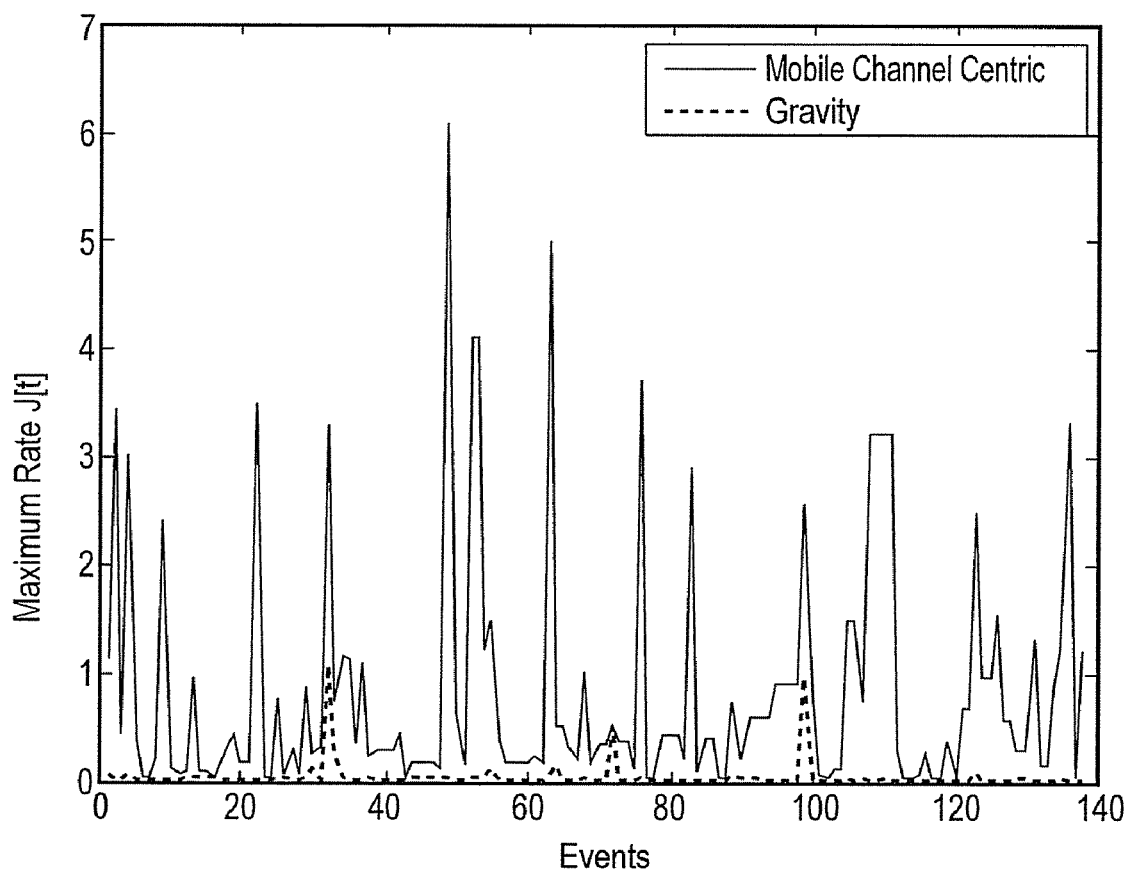

The results presented in FIGS. 9A and 9B is the outcome of 10000 trials for different sensor states. FIGS. 9A and 9B show the results for 20 sensors, not all of which need to be active at the same time. The performance is compared to the case when one base station is mobile and controlled to be located at the centre of gravity of the sensors within its range. It can be seen that compared to a base station located in the centre of gravity, the channel centric approach taking maximum rate into account in the decision process provides significant improvement in terms of maximum achievable rate. Over time, as operation of the system proceeds, this will translate into a throughput and delay advantage in a practical system.

Figure 10A:
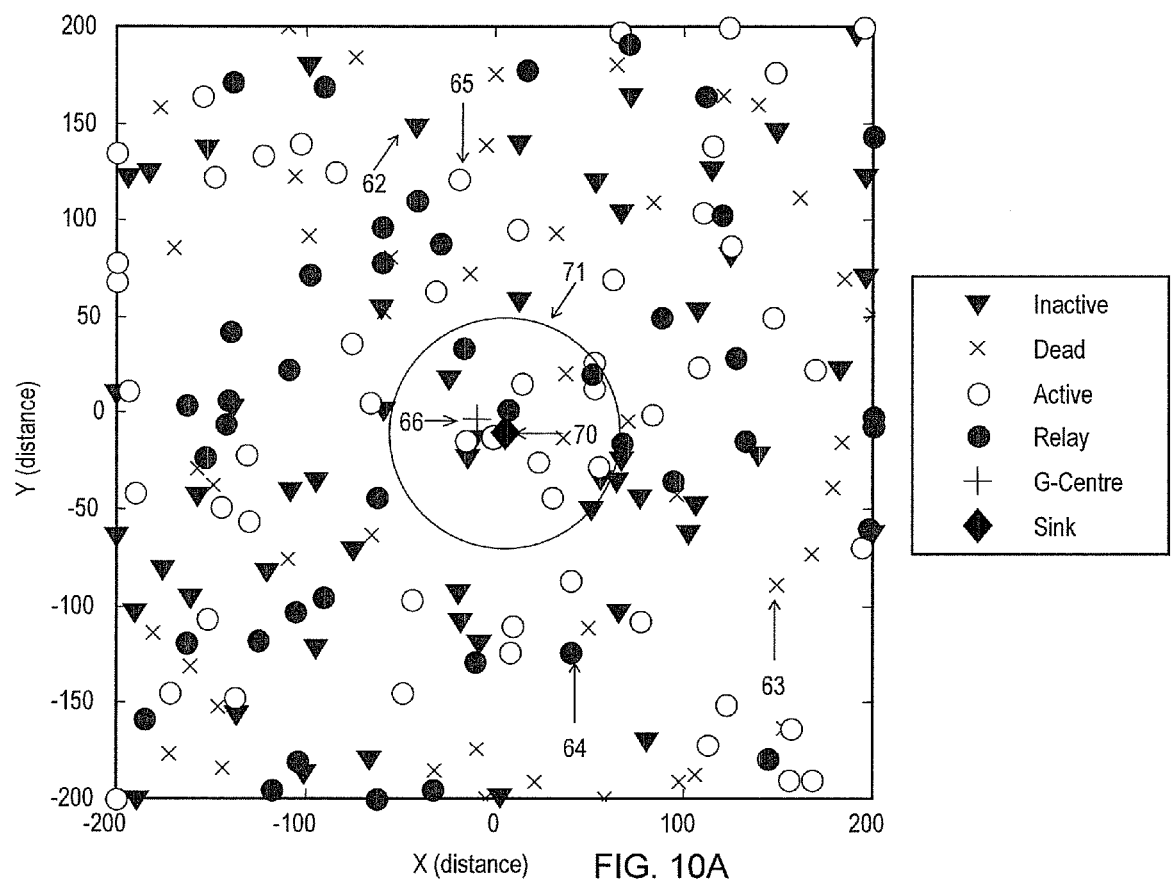
Figure 10B:
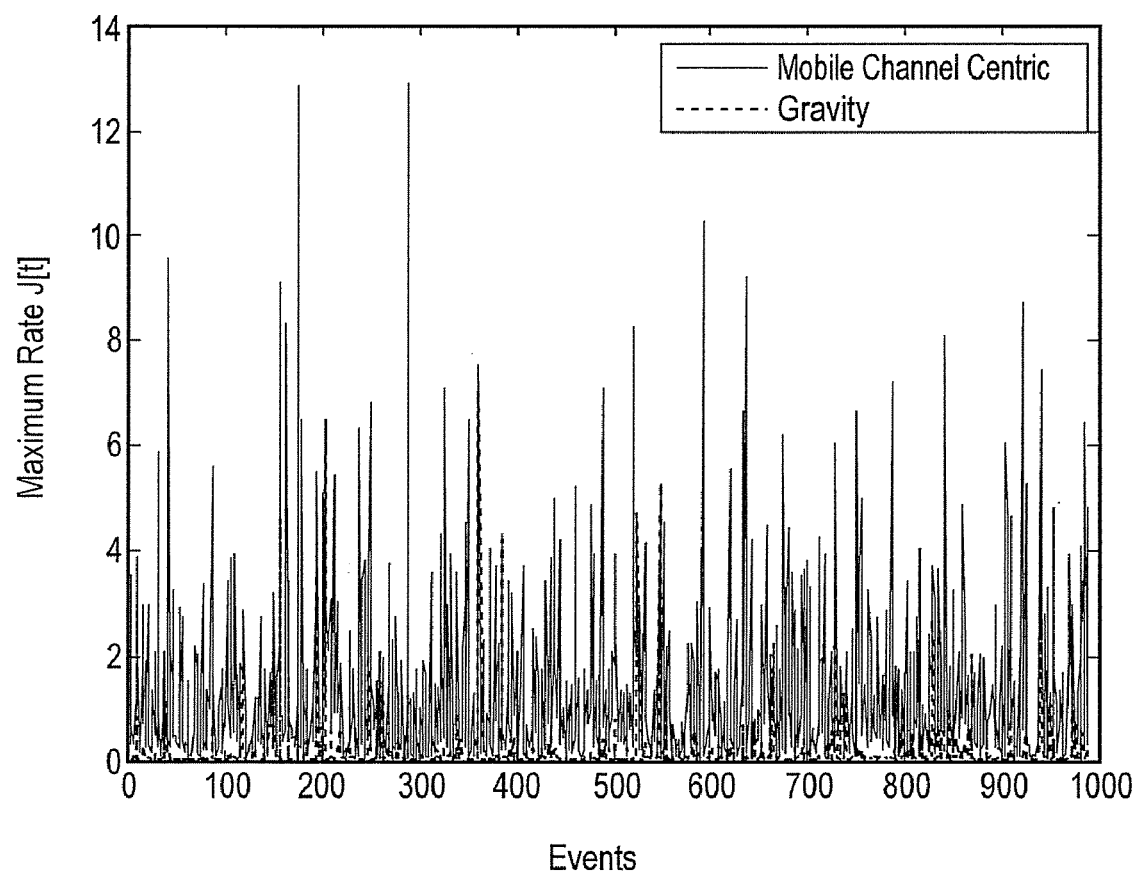

FIGS. 10A and 10B show the performance results when 200 sensors are present in a WSN.

It can be seen that compared to a mobile base station relocated at the centre of gravity, the proposed approach provides significant improvement in terms of maximum achievable rate.

Second Embodiment

The second embodiment takes account of the needs of the sensors more completely by introducing the concept of a "desired rate" for transmission by each sensor. Each sensor's desired rate depends on its remaining energy (see FIG. 2 again) and the distance between the sensor and the sink.

As in the first embodiment it is assumed that in the current fading environment, the maximum rate I(t) for a reliable communication is random. Using Shannon's theorem, and assuming that the code length is sufficiently high, the probability that the information transmitted over channel h(t) falls below a normalised data rate R (outage probability) can be expressed as:

$$P(I(t) < R) = P\left(|h(t)|^2 < \frac{(2^R - 1)N_0}{P_a d^{-\alpha}}\right) \quad (8)$$

where $P_a$ is the transmission power, $|h(t)|^2$ represents the channel capacity and the other variables are as before.

Each sensor employs a simple look-up table or equivalent which shows the distance from the sink versus the sensor energy as shown in Table 2. These two values are mapped to a unique desired rate R shown in the cells in Table 2. The "desired rate" is a transmission rate from the sensor to the sink which is appropriate bearing in mind the distance of the sensor from the sink, and the battery capacity remaining in the sensor. The desired rate may be set to influence the way the WSN operates. For example, to prevent battery drain when a sensor is loaded close to the sink, or to give a "fair" network, the sensor might deliberately reduce the transmission rate R for shorter sensor-sink separation, as shown by the higher values of R for larger distances from the sink in Table 2. Alternatively, for enhanced throughput, "R" might be higher for sensors closest to the sink.

TABLE 2

Table for obtaining sensor normalised maximum transmission rate employing distance from the sink and remaining energy

| | distance | | | | | | | | | |
|---|---|---|---|---|---|---|---|---|---|---|
| ϵ(t) | 0.1 | 0.2 | 0.3 | 0.4 | 0.5 | 0.6 | 0.7 | 0.8 | 0.9 | 1.0 |
| 20% | 0.01 | 0.02 | 0.04 | 0.15 | 0.25 | 0.35 | 0.55 | 0.75 | 0.9 | 1.0 |
| 40% | 0.1 | 0.15 | 0.18 | 0.22 | 0.33 | 0.45 | 0.65 | 0.85 | 0.95 | 1.0 |
| 60% | 0.2 | 0.25 | 0.30 | 0.35 | 0.45 | 0.55 | 0.75 | 0.95 | 1.0 | 1.0 |
| 80% | 0.4 | 0.55 | 0.65 | 0.78 | 0.85 | 0.95 | 1.0 | 1.0 | 1.0 | 1.0 |
| 100% | 0.5 | 0.6 | 0.75 | 0.85 | 0.95 | 1.0 | 1.0 | 1.0 | 1.0 | 1.0 |

The method of the first embodiment proceeds in basically the same way as the first embodiment but the steps will be enumerated again with the differences noted.

Figure 11:
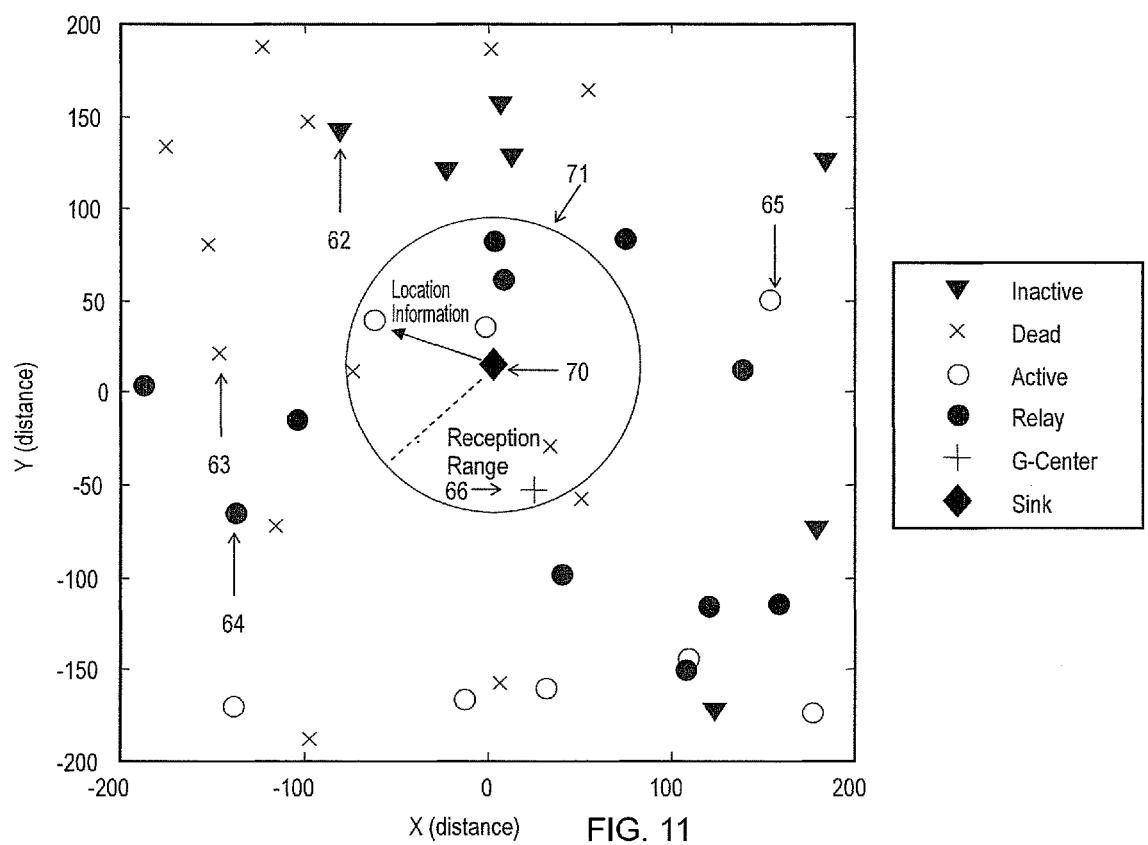
FIGS. 11 and 12 show successive steps in a method of a second embodiment.
Figure 12:
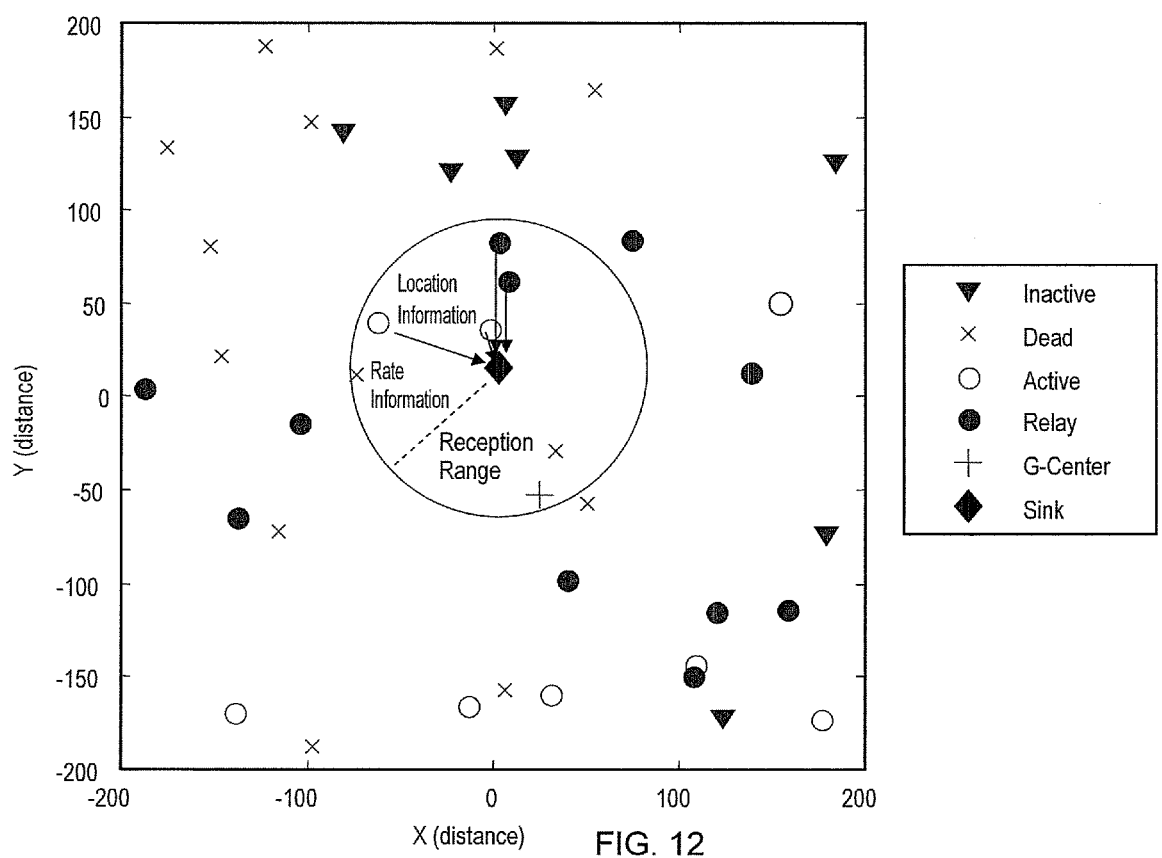

1. The mobile sink 70 sends a signal to the sensors within the reception range giving its current location information to all the active and relay sensor nodes within its reception range as shown in FIG. 11. The location can be identified in any known fashion.
2. The relay and active sensors (and potentially also the sensors that are asleep, or inactive) that receive the location information from sink (i.e. those within range), use their own current location and the sink's location to determine the distance d from the sink and then use their battery energy as shown for example in Table 2 to determine the based desired maximum rate R. These sensors then transmit the rate information and their location information to the sink as shown in FIG. 12. In either embodiment, therefore, a distance to the sink can be transmitted, rather than the location of the sensor but in the second embodiment the rate R is also transmitted.
This rate information could alternatively be sent later in the method, for example when the sink is in its first candidate location. This could give a more accurate measure for d in some circumstances and include sensors within range of the candidate location which were not in range of the original sink location.
3. The sink then receives this information and updates state information and determines its own distance from each sensor, unless the distance has already been provided by the sensor (either the state information can be sent from all the sensors or it can be determined based on information received in the previous step). It then determines the new centre of gravity for all the active and relay nodes within its reception range. The sink chooses a number of candidate locations surrounding the new centre of gravity and potentially including the new centre of gravity as before, based on a random or deterministic selection process within a specific radius of the centre of gravity.
4. The sink then temporarily moves to each candidate position, (for example the new centre of gravity and then other candidate locations). During this visit full and normal transmission-reception procedures are available between the sink and all the involved sensor nodes. As before, the sink functions as if it were in its permanent position and in each candidate location, the sink additionally asks the sensors to send a reference signal which will be employed to determine or estimate the channel information $h_{sx}(t)$ between the sinks and each sensor node x.
5. The sink then determines the mathematical "distance" related to the probability in (8) seen at time t between the sink at potential location j and each relay or active sensor node i as the difference between two metrics, as follows:

$$\omega_{ij}(t) = \frac{(2^{R_i} - 1)N_0}{P_x d_{ij}^{-\alpha}} - |h_{ji}(t)|^2 \quad (9)$$

where $R_i$ is the desired rate reported back by each sensor I, Px is allocated transmission power and $d_{ji}$ distance, essentially as before. The mathematical distance $\omega_{ij}$ which is the difference between the two metrics on the right hand side of the equation can be considered as an amount by which the candidate location is likely to fall short of meeting the desired rate of the sensors (and a negative "distance" is therefore desirable).

6. Then in order to minimize the probability in (8) (i.e. achieving the maximum throughput $I_j(t)$ for each sensor link) the sink first calculates the total of mathematical distance for all the current active and relay links, giving a total degree of uncertainty of achieving the required data rate or total shortfall as:

$$\omega_j(t) = \sum_{i=1}^{K} \omega_{ij}(t) = \sum_{i=1}^{K} \left( \frac{(2^{R_i} - 1)N_0}{P_x d_{ji}^{-\alpha}} - |h_{ji}(t)|^2 \right) \quad (10)$$

where K is the number of active relay and sensor nodes in range of the candidate location.

7. After the mobile sink has visited all the candidate locations in turn, it compares all the recorded values (including the values recorded at the centre of gravity where applicable) and chooses the location j that minimises the overall distance (i.e. maximises the total achievable reliable link throughput) as its permanent position until the next positioning event, using:

$$J(t) = \arg\min_j(\omega_j(t)) \quad (11)$$

8. The sink then moves to the position $J(t)$ as its new permanent position until the next decision time.

The effectiveness of the above method has been confirmed by performing simulations on a periodic event basis. Parameters for the simulation are shown in Table 3. Again it is assumed that sensors are moving around, and/or switching between active/inactive states, at random at discrete time points.

TABLE 3

Simulation Parameters

| Parameters | Value |
| --- | --- |
| Dimensions | 400 × 400 |
| Transmission Range | 30 |
| Reception Range (Sink) | 60 |

The result presented in FIGS. 13A, 13B, 14A and 14B is the outcome of 10000 trials (time steps) for different sensor states. The results are shown in two ways: in terms of "distance" (i.e. the probability-related mathematical distance between two metrics as discussed above):—FIGS. 13A and 14A; and in terms of maximum rate I(t):—FIGS. 13B and 14B).

Figure 13A:
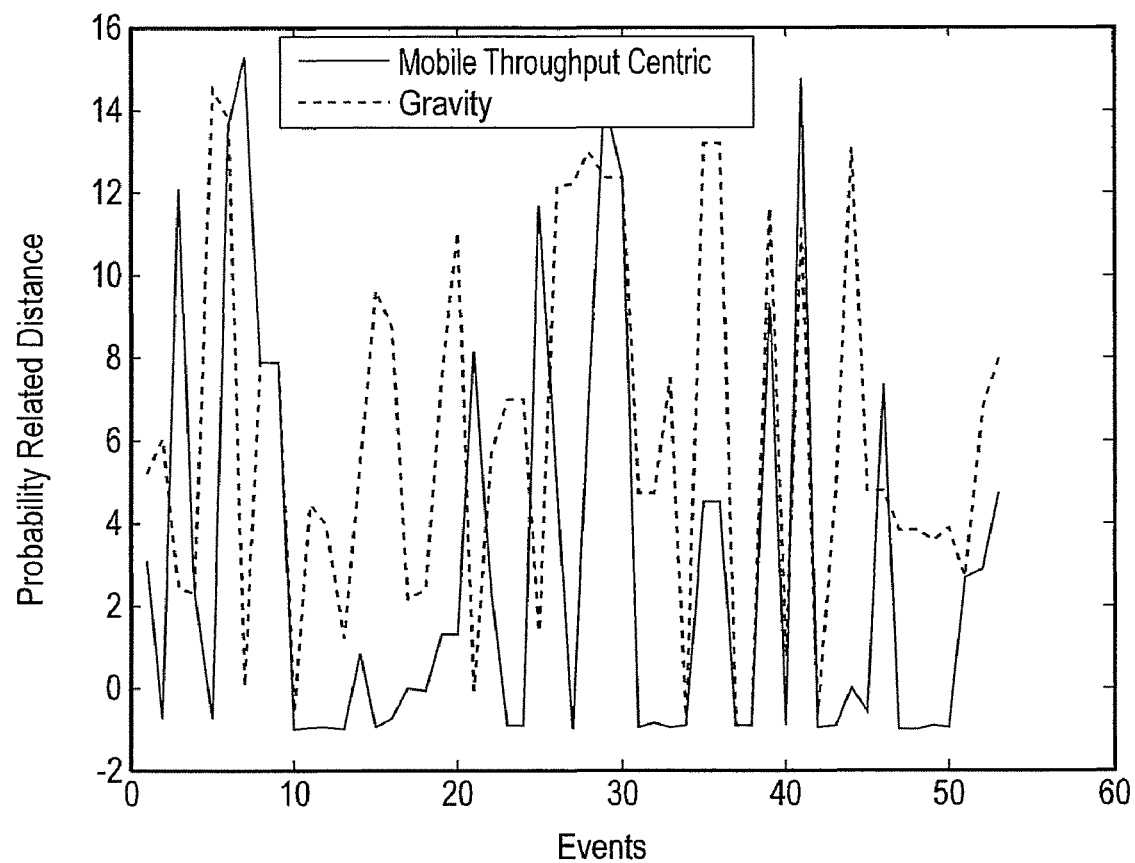
FIGS. 13A and 13B, and 14A and 14B, show the results of simulations for indicating the effect of a second embodiment of the present invention.
Figure 13B:
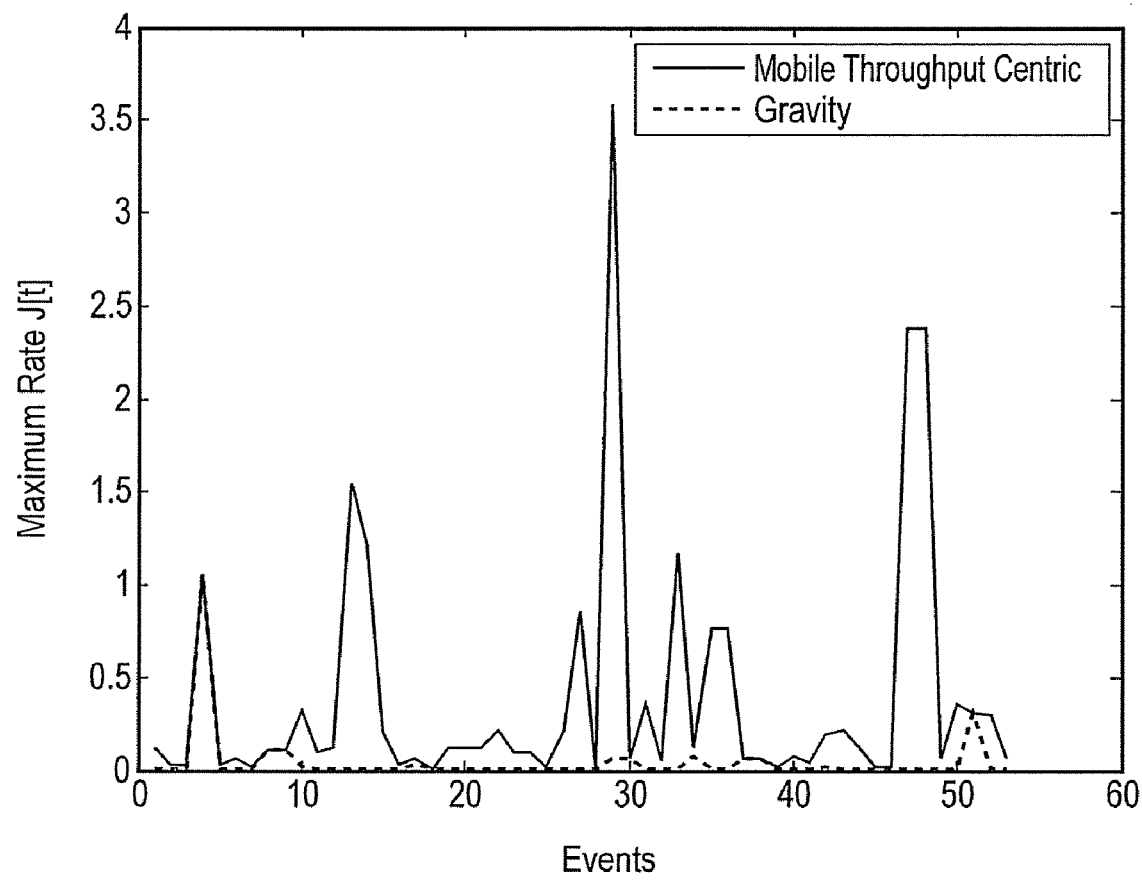

FIGS. 13A/B show the results for 20 sensors. The performance from applying the second embodiment is compared to a simple method in which the mobile sink is located at the centre of gravity. It can be seen that compared to this simple gravity centered approach, the approach of the second embodiment provides significant improvement in terms of maximum achievable rate as a result of the reduced probability-related distance. As time elapses and sensors move around/change state, this will eventually translate to a throughput and delay advantage or a fair allocation of resources in a practical system, depending on how the rate information within the table is set up.

Figure 14A:
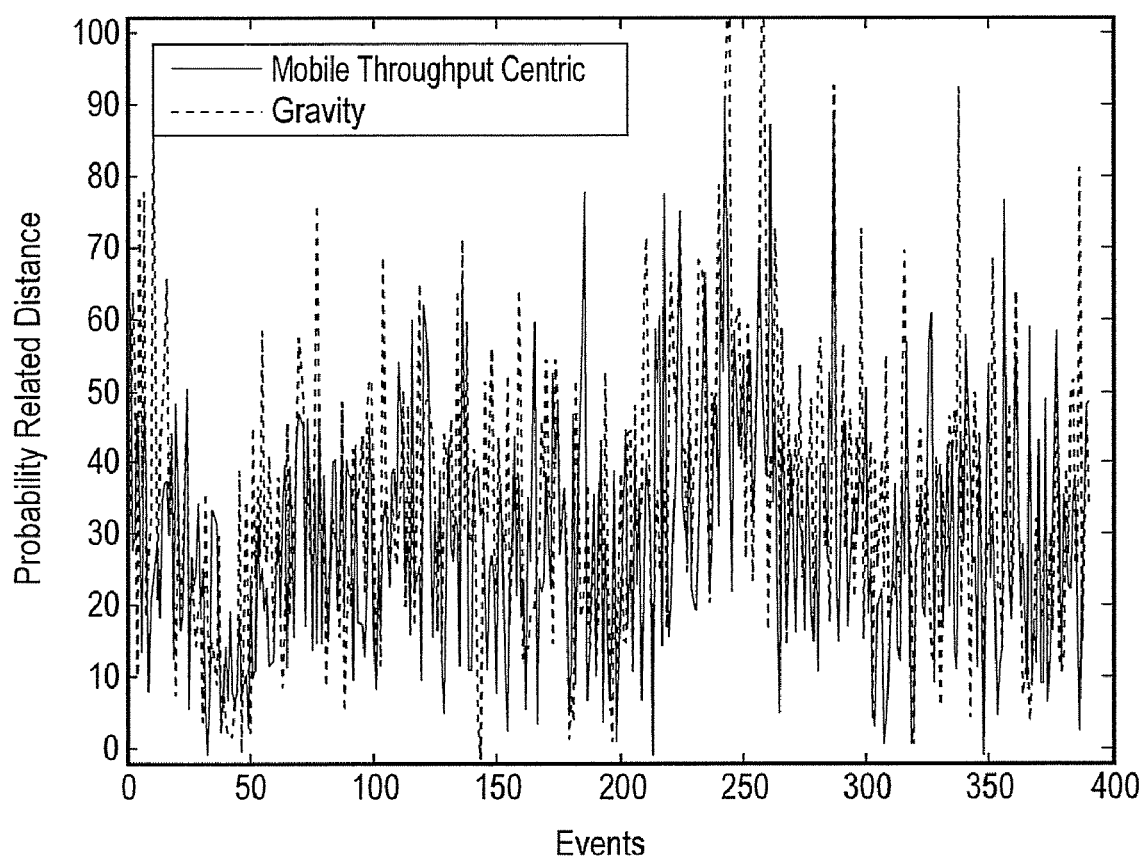
Figure 14B:
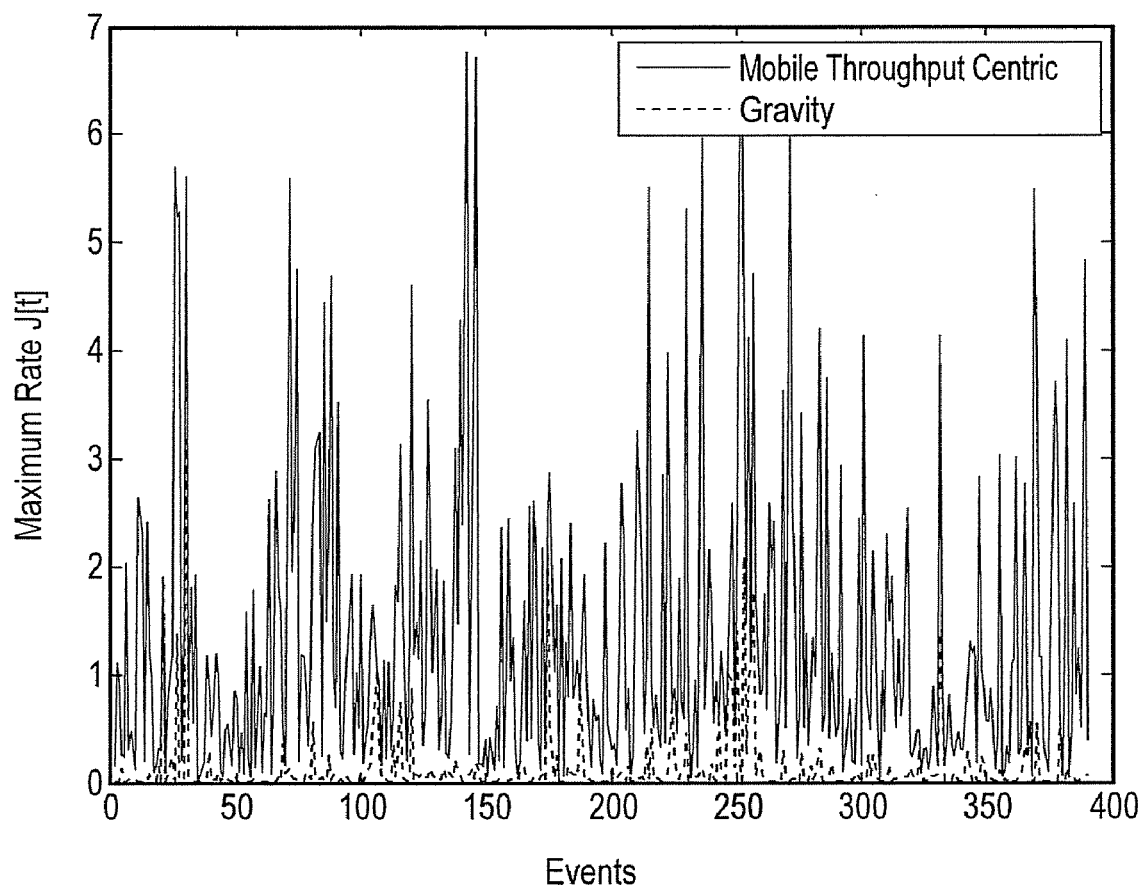

FIGS. 14A/B shows the performance results when 200 sensors (not all active) are present in the WSN, with the same comparative and with similar results.

Either of the above embodiments, including the simulations, can be applicable in a network with moving sensors, or in a network with stationary sensors. For the latter case, the changing states of the fixed sensors will be sufficient to shift the centre of gravity.

Third Embodiment

In a third embodiment which is particularly suitable for the fixed sensor scenario, the method proceeds essentially as per the second embodiment, but the desired rate R is based on transmission power and energy, as set out below in Table 4.

TABLE 4

Table for obtaining sensor normalised maximum transmission rate employing transmission power $P_x$ and remaining energy.

| | $P_x$ | | | | | | | | | |
| --- | --- | --- | --- | --- | --- | --- | --- | --- | --- | --- |
| $\epsilon(t)$ | 0.1 | 0.2 | 0.3 | 0.4 | 0.5 | 0.6 | 0.7 | 0.8 | 0.9 | 1.0 |
| 20% | 0.01 | 0.02 | 0.04 | 0.15 | 0.25 | 0.35 | 0.55 | 0.75 | 0.9 | 1.0 |
| 40% | 0.1 | 0.15 | 0.18 | 0.22 | 0.33 | 0.45 | 0.65 | 0.85 | 0.95 | 1.0 |
| 60% | 0.2 | 0.25 | 0.30 | 0.35 | 0.45 | 0.55 | 0.75 | 0.95 | 1.0 | 1.0 |
| 80% | 0.4 | 0.55 | 0.65 | 0.78 | 0.85 | 0.95 | 1.0 | 1.0 | 1.0 | 1.0 |
| 100% | 0.5 | 0.6 | 0.75 | 0.85 | 0.95 | 1.0 | 1.0 | 1.0 | 1.0 | 1.0 |

1. In this third embodiment, the sink has its own reception range and is fully aware of the location of all the involved sensors. First, the sink estimates how many of the sensors are within its reception range from its current position.
2. The sink then sends a signal that informs the entire active or relay sensor nodes within the reception range to inform their state and maximum normalised data rate $R_i$ to it.
3. The sink then receives the updated state and rate information from the sensors to determine the current centre of gravity for all active and relay nodes within its reception range. Each sensor employs Table 4 to estimate the desired rate and the sink chooses number of potential future locations surrounding the current gravity centre as before, based on a random or deterministic selection process within a specific radius of its current location.
4. The method continues for steps 4 to 8 as per the second embodiment.

The effectiveness of the above method has been confirmed by performing simulations on a periodic event basis. Parameters for the simulations are shown in Table 5.

TABLE 5

Simulation Parameters

| Parameters | Value |
| --- | --- |
| Dimensions | 400 × 400 |
| Transmission Range | 30 |
| Reception Range (Sink) | 80 |

Figure 15A:
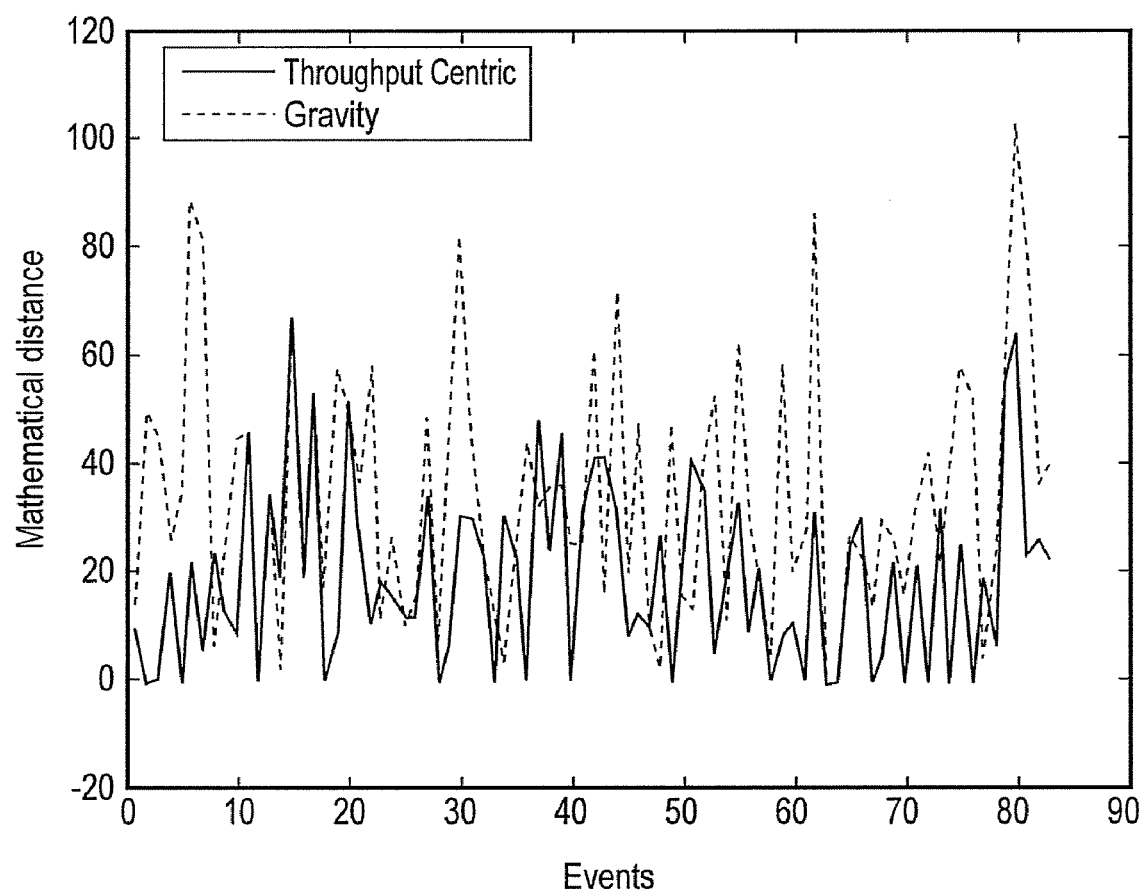
FIGS. 15A and 15B, 16A and 16B show the results of simulations for indicating the effect of a third embodiment of the present invention.
Figure 15B:
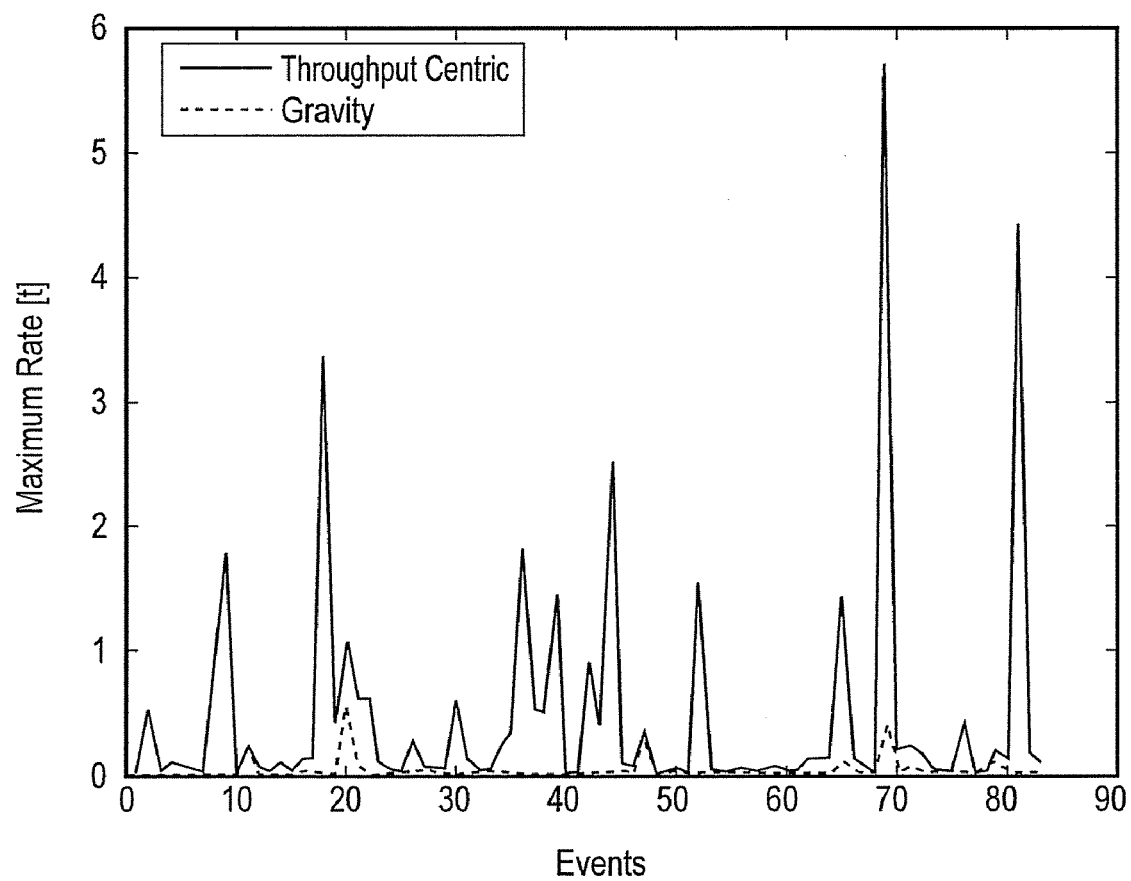

The result presented in following FIGS. 15A and 15B is the outcome of 10000 trials for different sensor states. FIGS. 15A and 15B show the results for 20 fixed sensors. It shows the total estimated mathematical distance and the total estimated throughput at the sink from all the links. It can be seen that compared to a gravity oriented approach the proposed approach taking a desired rate into account provides a significant improvement tin terms of maximum achievable rate as a result of the reduced mathematical distance. Over time, this would eventually translate to a throughput and delay advantage in a practical system.

Figure 16A:
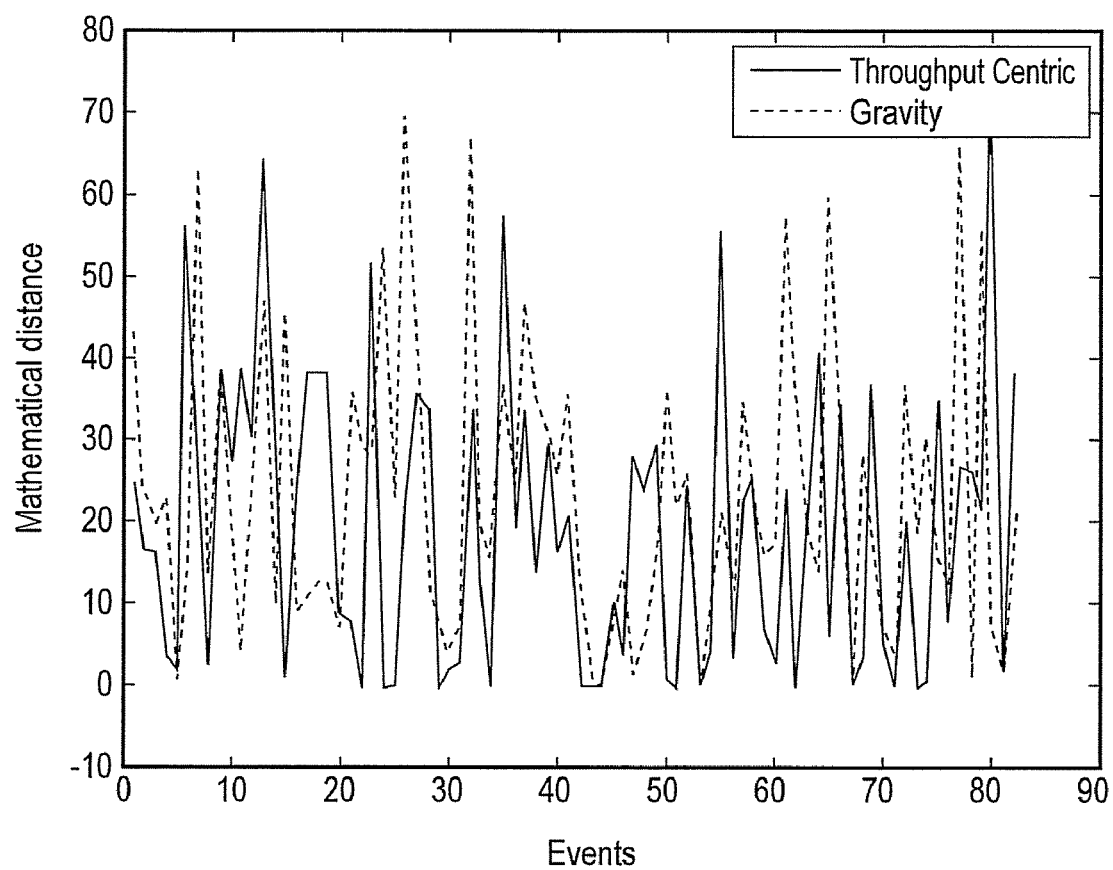
Figure 16B:
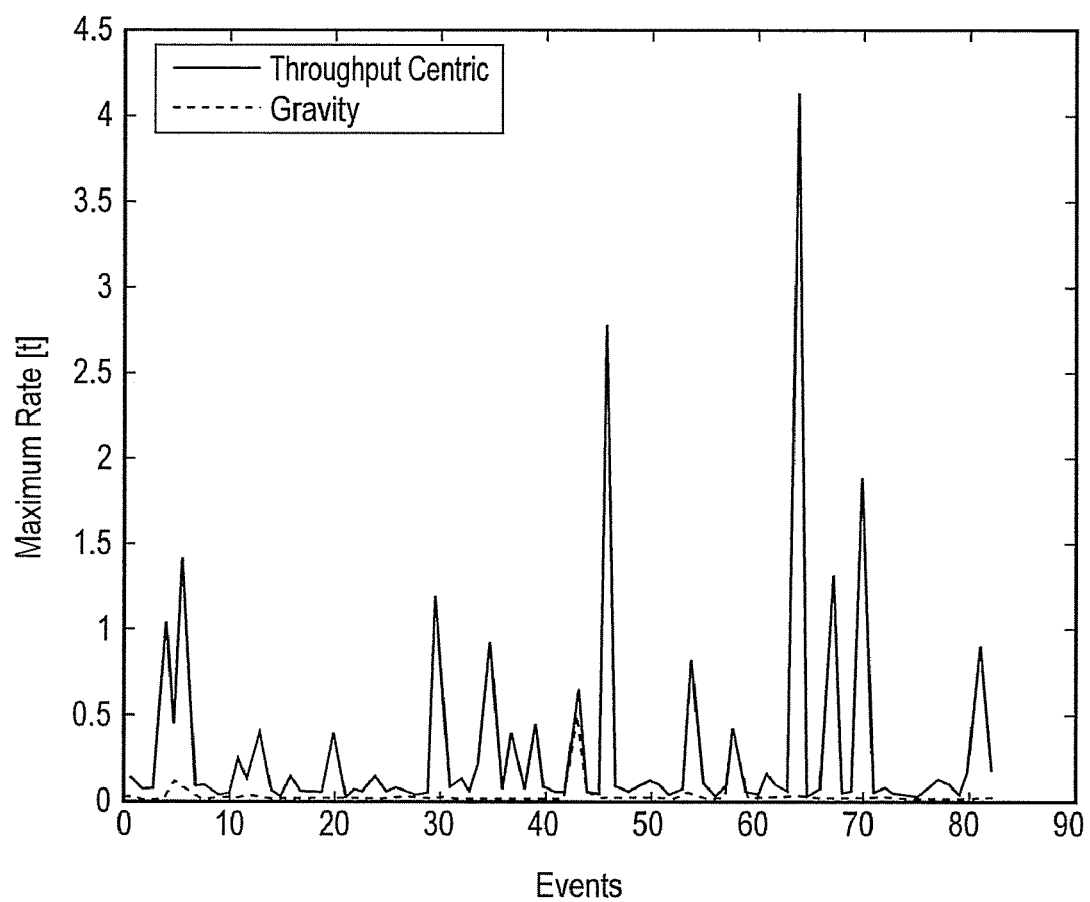

FIGS. 16A and 16B shows the performance results when 40 sensors are present in a WSN. It can be seen that compared to a gravity oriented approach, the proposed approach provides significant improvement in terms of maximum achievable rate.

The above description and simulations have considered as an example a WSN over a square area provided with a single mobile sink, which is not a sensor. As will be apparent to those skilled in the art, such a configuration is considered merely for convenience and the present invention can be applied to any shape of WSN as well as to arrangements in which there is more than one mobile sink. The present invention may also be applied to part of a WSN extending over a wider area.

In the above embodiments, it might be arranged that the sink has the ability to communicate wirelessly or by a separate wired network directly with an entity outside the WSN. If the sink can communicate wirelessly with the outside entity, the latter need not always be at a fixed location but could be mobile. The sink may route data to a delivery port directly, or by using sensors as relays. The "delivery port" may take the form of a gateway to another network.

In the above description, various calculations have been referred to, for example by the candidate grid points. It may be possible for some or all of such calculations to be replaced by look-up tables along similar lines to that shown in Table 2 for the sensor desired rate. References to "calculating means" in the claims are thus to be interpreted broadly.

Thus, embodiments of the present invention involve the following features:

(1) Improved sink positioning in wireless sensor networks when the sensors are mobile and/or when their state changes.
(2) A mobile maximum rate and channel centric novel method to reposition the sink in a wireless sensor network.
(3) A method of relating the mobility of sink to both the changing state of sensors and optionally, the changing location of sensors within WSN.
(4) Novel signalling from the sink to the sensors to ask for location information.
(5) Novel signalling from the sensors to the sink carrying the location information.
(6) Novel signalling from the sink to the sensors to ask for state information.
(7) Novel signalling from the sensors to the sink carrying the state information.
(8) Updated centers of gravity based on the geographical centre of gravity of mobile active and relay sensors.
(9) Mobility of the sink within multiple candidate points within the vicinity of the mobile centre of gravity point.
(10) Novel criteria to determine the new location for sensors in a wireless sensor network
(11) Moving the base station or sink in a wireless sensor network involving each sensor's preferred rate considering its distance from the sink and its remaining battery energy.
(12) Novel signalling between the sink and sensors where the sink informs the entire set of active and relay sensors within its range about its location.
(13) Functionality in the sensors which lets them determine their current distance from the sink and estimate their desired maximum rate taking into account the current distance from sink and its remaining battery power based on a lookup table in memory of the sensor.
(14) Novel methods that combine full mobility of WSN and a throughput-probability based optimization to maximize the throughput.

The effects of the embodiments include:
improving the throughput in a wireless sensor network;
improving the packet delivery delay in a mobile WSN;
improving the connectivity in dense mobile WSN networks;
improving the connectivity in a sparse WSN network;
improving the sensor life time; and
improving the coverage in a mobile WSN.

To summarise, the present invention provides a technique for "dynamic" sink relocation in a WSN, in which the sink is physically moved. To re-position the sink, candidate sink positions are found using information from the sensors. Then the candidate sink locations are assessed to give a measure of their suitability to act as the new permanent position. To do this, the sink moves to each of the candidate positions in turn and obtains data and/or signals from the sensors within range to estimate a total throughput expected if the sink range is located at that position. The sink then transfers to the most suitable candidate position permanently, until the dynamic repositioning process is triggered again. In this way it is possible to achieve a better performance than if only the centre of gravity of the sink is taken into account to position the sink. In the second embodiment, sensors are allowed to have their say in future positioning of the sink; this involves providing a capability for the sensor that makes it possible to consider both distance from the sink and the remaining battery power to come up with the best desired maximum information rate. In effect, the sensors and sink make a collective decision on the future location of the sink.

In any of the above aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

The invention claimed is:

1. A method of relocating a mobile sink in a wireless sensor network, the wireless sensor network comprising sensors for transmitting sensor data and the mobile sink, the method including:

selecting candidate sink locations;

finding the suitability of each candidate sink location using a calculation producing a result indicating the suitability of the candidate sink location for communication with a plurality of the sensors;

comparing the result for each candidate sink location to determine the most suitable candidate sink location; and locating the mobile sink at the most suitable candidate sink location by physically positioning the mobile sink.

2. The method according to claim 1 further including the sensors transmitting sensor information for use during the locating method.

3. The method according claim 1, wherein the selection of candidate sink locations includes identifying the centre of gravity of the sensors within reception range of the sink and selecting locations surrounding the centre of gravity.

4. The method according to claim 2, wherein the sensor information includes sensor location information, the location information being subsequently used to identify the centre of gravity during the selection of candidate sink locations.

5. The method according to claim 1, wherein finding the suitability of each candidate sink location includes physically positioning the sink at that location and receiving transmissions from the sensors within range of that location.

6. The method according to claim 1, wherein finding the suitability of each candidate sink location includes the sensors within range of that candidate sink location sending a reference signal to assist the sink in estimating a channel between the sensor and the potential sink and the sink performing the calculation based on the reference signal received from those sensors at that candidate sink location.

7. The method according to claim 6 wherein the sink determines a transmission rate achievable from each sensor by estimating the channel and taking into account the sensor information transmitted to the sink by the sensors.

8. The method according to claim 7 wherein the sink calculates a total transmission rate for the sensors within its range, and compares the result for each candidate location to determine the most suitable candidate sink location.

9. The method according to claim 2, wherein the sensor information includes desired rate information of the sensor indicating a transmission rate with which the sensor wishes to send data to the sink, and finding the suitability of each candidate sink location includes the sink calculating a distance related to the probability at each candidate sink location that the transmission rate from each sensor will fall below the desired rate owing to limitations of the channel between them.

10. The method according to claim 9 wherein the sink calculates a total distance related to probability for all the sensors within range for each candidate sink location and wherein the most suitable candidate sink location is the location with the lowest total distance.

11. The method according to claim 9 wherein each sensor obtains the desired rate information on the basis of the sensor information, including its distance from the sink and energy available to the sensor.

12. The method according to claim 1, wherein the sink carries out normal sensor data reception and transmission when it is in each candidate location.

13. A wireless sensor network comprising sensors and a mobile sink, wherein:

the sensors are operable to transmit sensor data and sensor information to the mobile sink;

the mobile sink is operable to select two or more candidate sink locations using the sensor information;

the sink is operable to find the suitability of the candidate sink locations using a calculation producing a result indicating suitability for communication with a plurality of the sensors; and the sink is operable to compare the result for each candidate sink location to determine the most suitable candidate sink location and to move to the most suitable candidate sink location thus found.

14. A device for use as a mobile sink in a wireless sensor network having sensors and the mobile sink, the device comprising:

a wireless transceiver for receiving and transmitting data within a communication range;

a selection element operable to select two or more candidate sink locations within the communication range; a calculator operable to provide a measure of the potential sink location's suitability for communication with a plurality of the sensors; a deciding element operable to determine the most suitable candidate sink location based on said measure; and a device repositioner operable to move the device to the most suitable candidate sink location.

* * * * *

UNITED STATES PATENT AND TRADEMARK OFFICE
CERTIFICATE OF CORRECTION

PATENT NO. : 8,310,359 B2
APPLICATION NO. : 12/482236
DATED : November 13, 2012
INVENTOR(S) : Saied Abedi Page 1 of 1

It is certified that error appears in the above-identified patent and that said Letters Patent is hereby corrected as shown below:

Title Page

Insert -- (30) Foreign Application Priority Data, June 10, 2008, (EPO); 08157990.6 --, therefor.

Signed and Sealed this
Nineteenth Day of March, 2013

Teresa Stanek Rea
*Acting Director of the United States Patent and Trademark Office*